US008021493B2

(12) United States Patent
Smith et al.

(10) Patent No.: US 8,021,493 B2
(45) Date of Patent: *Sep. 20, 2011

(54) METHOD OF REDUCING CORROSION USING A WAREWASHING COMPOSITION

(75) Inventors: Kim R. Smith, Woodbury, MN (US); Keith E. Olson, Apple Valley, MN (US); Michael E. Besse, Golden Valley, MN (US); Michael J. Bartelme, Eden Prairie, MN (US)

(73) Assignee: Ecolab USA Inc., St. Paul, MN (US)

( * ) Notice: Subject to any disclaimer, the term of this patent is extended or adjusted under 35 U.S.C. 154(b) by 201 days.

This patent is subject to a terminal disclaimer.

(21) Appl. No.: 12/114,385

(22) Filed: May 2, 2008

(65) Prior Publication Data
US 2008/0274930 A1 Nov. 6, 2008

Related U.S. Application Data

(60) Provisional application No. 60/927,575, filed on May 4, 2007.

(51) Int. Cl.
*B08B 9/20* (2006.01)
*B08B 7/00* (2006.01)
*C11D 3/04* (2006.01)

(52) U.S. Cl. .......... 134/25.2; 134/42; 510/221; 510/227
(58) Field of Classification Search ............... 134/25.2, 134/42; 510/221, 227
See application file for complete search history.

(56) References Cited

U.S. PATENT DOCUMENTS

| | | | |
|---|---|---|---|
| 3,653,095 A * | 4/1972 | Dupre et al. .................. 422/13 |
| 3,898,186 A * | 8/1975 | Mermelstein et al. ........ 510/236 |
| 3,931,031 A | 1/1976 | Willard, Sr. |
| 4,036,749 A | 7/1977 | Anderson |
| 4,038,430 A | 7/1977 | Drake et al. |
| 4,150,001 A | 4/1979 | Sen |
| 4,435,307 A | 3/1984 | Barbesgaard et al. |
| 4,436,643 A | 3/1984 | Burger et al. |
| 4,443,270 A | 4/1984 | Biard et al. |
| 4,678,685 A | 7/1987 | Hasson et al. |
| 4,713,159 A | 12/1987 | Truitt et al. |
| 4,820,439 A | 4/1989 | Rieck |
| 4,844,828 A | 7/1989 | Aoki |
| 4,908,148 A | 3/1990 | Caravajal et al. |
| 4,917,812 A | 4/1990 | Cilley |
| 4,966,606 A | 10/1990 | Garner-Gray et al. |
| 5,182,028 A | 1/1993 | Boffardi et al. |
| 5,277,823 A | 1/1994 | Hann et al. |
| 5,308,403 A | 5/1994 | Yam et al. |
| 5,364,551 A | 11/1994 | Lentsch et al. |
| 5,376,310 A | 12/1994 | Cripe et al. |
| 5,407,471 A | 4/1995 | Rohr et al. |
| 5,431,836 A | 7/1995 | Carr et al. |
| 5,531,931 A | 7/1996 | Koefod |
| 5,540,866 A | 7/1996 | Aszman et al. |
| 5,624,892 A | 4/1997 | Angevaare et al. |
| 5,698,506 A | 12/1997 | Angevaare et al. |
| 5,733,865 A | 3/1998 | Pancheri et al. |
| 5,783,539 A | 7/1998 | Angevaare et al. |
| 5,863,877 A | 1/1999 | Carr et al. |
| 5,874,397 A | 2/1999 | Schimmel et al. |
| 5,879,562 A | 3/1999 | Garbutt |
| 5,891,225 A | 4/1999 | Mishra et al. |
| 5,993,737 A | 11/1999 | Mackintosh et al. |
| 6,083,894 A | 7/2000 | Keyes et al. |
| 6,221,146 B1 | 4/2001 | Fortier et al. |
| 6,299,701 B1 | 10/2001 | Aubay et al. |
| 6,365,101 B1 | 4/2002 | Nguyen et al. |
| 6,402,824 B1 | 6/2002 | Freeman et al. |
| 6,440,917 B1 | 8/2002 | Church et al. |
| 6,448,210 B1 | 9/2002 | Keyes et al. |
| 6,622,736 B1 | 9/2003 | Hahn |

(Continued)

FOREIGN PATENT DOCUMENTS

| | | |
|---|---|---|
| CH | 673033 A5 * | 10/1987 |
| EP | 0008211 B1 | 12/1981 |
| EP | 0241962 | 5/1990 |
| EP | 303761 | 9/1992 |
| EP | 0406662 | 3/1995 |
| EP | 130756 | 6/2000 |
| EP | 0828812 | 10/2001 |

(Continued)

OTHER PUBLICATIONS

Author Unknown, "Introducing Revolutionary Nano-Crystal Technology for Eliminating Scale," ScaleX2-Revolutionary Scale Prevention Technology, OptiPure, http://www.optipurewater.com/Downloads/Other_downloads/SX2Techbro.pdf.

Berner, R.A., "The Role of Magnesium in the Crystal Growth of Calcite and Aragonite from Sea Water," Geochimica et Cosmochimica Acta, vol. 39, Issue 4, Apr. 1975, pp. 489-494.

Bischoff, J.L. and Fyfe, W.S., "Catalysis, Inhibition, and the Calcite-Aragonite Problem," American Journal of Science, vol. 266, Feb. 1968, pp. 65-79.

(Continued)

*Primary Examiner* — Lorna M Douyon
(74) *Attorney, Agent, or Firm* — Andrew D. Sorensen; Laura C. DiLorenzo

(57) ABSTRACT

A warewashing composition includes a cleaning agent having a detersive amount of a surfactant, an alkaline source in an amount effective to provide a use composition having a pH of at least about 8 when the use composition is measured at a solids concentration of about 0.5 wt %, and a corrosion inhibitor in an amount sufficient for reducing corrosion of glass when the warewashing composition is combined with water of dilution at a dilution ratio of at least about 20:1 water of dilution to detergent composition o form a use composition. The corrosion inhibitor includes a salt of calcium, magnesium, or a mixture of calcium and magnesium. The salt has a water solubility of less than about 0.5 wt % in water at about 20° C. and atmospheric pressure so that the salt precipitates to form a protective layer on a substrate in contact with the use composition. A method of reducing corrosion using the warewashing composition is also disclosed.

11 Claims, No Drawings

U.S. PATENT DOCUMENTS

| | | | |
|---|---|---|---|
| 6,652,747 B2 | 11/2003 | Hvarre | |
| 6,685,908 B1 | 2/2004 | Yaniv | |
| 6,686,325 B2* | 2/2004 | Hoyt et al. | 510/255 |
| 6,693,071 B2 | 2/2004 | Ghosh et al. | |
| 6,694,989 B2 | 2/2004 | Everson et al. | |
| 6,777,384 B2 | 8/2004 | Raths et al. | |
| 6,790,822 B1* | 9/2004 | Baba et al. | 510/471 |
| 6,794,345 B2 | 9/2004 | Elsner et al. | |
| 6,806,245 B2 | 10/2004 | Hahn | |
| 6,812,194 B2* | 11/2004 | Ruhr et al. | 510/202 |
| 6,815,410 B2 | 11/2004 | Boutique et al. | |
| 6,835,702 B2 | 12/2004 | Herdt et al. | |
| 6,881,713 B2 | 4/2005 | Sommerville-Roberts et al. | |
| 6,916,777 B2 | 7/2005 | Connor et al. | |
| 6,992,052 B2 | 1/2006 | Song | |
| 7,026,278 B2 | 4/2006 | Price et al. | |
| 7,033,980 B2* | 4/2006 | Waits et al. | 510/221 |
| 7,063,895 B2 | 6/2006 | Rodrigues et al. | |
| 7,077,963 B2 | 7/2006 | McConchie et al. | |
| 7,087,662 B2 | 8/2006 | Ghosh et al. | |
| 7,094,740 B2 | 8/2006 | Berger et al. | |
| 7,101,833 B2 | 9/2006 | Berger et al. | |
| 7,135,448 B2 | 11/2006 | Lentsch et al. | |
| 7,153,816 B2 | 12/2006 | Kessler et al. | |
| 7,196,044 B2* | 3/2007 | Smith et al. | 510/225 |
| 7,241,726 B2 | 7/2007 | Song et al. | |
| 7,273,558 B2 | 9/2007 | Miecznik | |
| 7,320,957 B2 | 1/2008 | Brooker et al. | |
| 7,467,633 B2* | 12/2008 | Smith et al. | 134/25.2 |
| 7,709,434 B2 | 5/2010 | Smith et al. | |
| 7,858,574 B2* | 12/2010 | Smith et al. | 510/224 |
| 2002/0111285 A1 | 8/2002 | Price et al. | |
| 2002/0172773 A1 | 11/2002 | Ghosh et al. | |
| 2003/0008794 A1 | 1/2003 | Jaynes | |
| 2003/0008801 A1 | 1/2003 | Raths et al. | |
| 2003/0045439 A1* | 3/2003 | Evers | 510/238 |
| 2003/0050205 A1 | 3/2003 | Hahn | |
| 2003/0073596 A1 | 4/2003 | Chiou et al. | |
| 2003/0078176 A1 | 4/2003 | Elsner et al. | |
| 2003/0111097 A1 | 6/2003 | Everson et al. | |
| 2003/0166492 A1 | 9/2003 | Holderbaum et al. | |
| 2003/0166493 A1 | 9/2003 | Holderbaum et al. | |
| 2003/0176305 A1* | 9/2003 | Hoyt et al. | 510/245 |
| 2004/0034905 A1 | 2/2004 | Underwood et al. | |
| 2004/0048760 A1 | 3/2004 | Rabon et al. | |
| 2004/0058846 A1 | 3/2004 | Kistenmacher et al. | |
| 2004/0121926 A1 | 6/2004 | Waits et al. | |
| 2004/0147427 A1 | 7/2004 | Waits et al. | |
| 2004/0162226 A1 | 8/2004 | Sunder et al. | |
| 2004/0167048 A1 | 8/2004 | Sunder et al. | |
| 2004/0176264 A1 | 9/2004 | Song et al. | |
| 2004/0176269 A1 | 9/2004 | Song | |
| 2004/0180807 A1 | 9/2004 | Song et al. | |
| 2004/0220068 A1 | 11/2004 | Hahn | |
| 2004/0259751 A1 | 12/2004 | Kessler et al. | |
| 2005/0003979 A1 | 1/2005 | Lentsch et al. | |
| 2005/0020464 A1 | 1/2005 | Smith et al. | |
| 2005/0075258 A1* | 4/2005 | Kessler et al. | 510/221 |
| 2005/0087213 A1 | 4/2005 | Hahn | |
| 2005/0113271 A1 | 5/2005 | Pegelow et al. | |
| 2005/0119150 A1 | 6/2005 | Pegelow et al. | |
| 2005/0119154 A1 | 6/2005 | Song et al. | |
| 2005/0137106 A1 | 6/2005 | Song et al. | |
| 2005/0143278 A1 | 6/2005 | Pegelow et al. | |
| 2005/0143280 A1 | 6/2005 | Nelson et al. | |
| 2005/0148479 A1 | 7/2005 | Barthel et al. | |
| 2005/0148488 A1 | 7/2005 | Jekel et al. | |
| 2005/0153868 A1 | 7/2005 | Berger et al. | |
| 2005/0155131 A1 | 7/2005 | Underwood et al. | |
| 2005/0181962 A1 | 8/2005 | Pegelow et al. | |
| 2005/0187136 A1 | 8/2005 | Pegelow et al. | |
| 2005/0187137 A1 | 8/2005 | Pegelow et al. | |
| 2005/0225003 A1 | 10/2005 | Holderbaum et al. | |
| 2005/0233925 A1* | 10/2005 | Foley et al. | 510/197 |
| 2005/0239680 A1 | 10/2005 | Buchmeier et al. | |
| 2005/0253116 A1 | 11/2005 | Hahn | |
| 2005/0261156 A1 | 11/2005 | Kottwitz et al. | |
| 2005/0261158 A1 | 11/2005 | Kottwitz et al. | |
| 2006/0030506 A1 | 2/2006 | Song et al. | |
| 2006/0035807 A1 | 2/2006 | Kasturi et al. | |
| 2006/0046954 A1 | 3/2006 | Smith et al. | |
| 2006/0069001 A1 | 3/2006 | Song | |
| 2006/0069002 A1 | 3/2006 | Song et al. | |
| 2006/0069003 A1 | 3/2006 | Song et al. | |
| 2006/0069004 A1 | 3/2006 | Song et al. | |
| 2006/0069005 A1 | 3/2006 | Song | |
| 2006/0075576 A1 | 4/2006 | Price et al. | |
| 2006/0079430 A1 | 4/2006 | Berger et al. | |
| 2006/0079437 A1 | 4/2006 | Kondo et al. | |
| 2006/0089294 A1 | 4/2006 | Depoot et al. | |
| 2006/0094634 A1 | 5/2006 | Jekel et al. | |
| 2006/0116304 A1 | 6/2006 | McRitchie et al. | |
| 2006/0116309 A1 | 6/2006 | Lambotte et al. | |
| 2006/0122089 A1 | 6/2006 | Lambotte et al. | |
| 2006/0123852 A1 | 6/2006 | Wiedemann et al. | |
| 2006/0128602 A1 | 6/2006 | Lentsch et al. | |
| 2006/0135394 A1 | 6/2006 | Smith et al. | |
| 2006/0157084 A1 | 7/2006 | Wiedemann et al. | |
| 2006/0189508 A1 | 8/2006 | Brooker et al. | |
| 2006/0194708 A1 | 8/2006 | Barthel et al. | |
| 2006/0199750 A1 | 9/2006 | Berger et al. | |
| 2006/0217286 A1 | 9/2006 | Geoffroy et al. | |
| 2006/0223734 A1 | 10/2006 | Bayersdoerfer et al. | |
| 2006/0223738 A1 | 10/2006 | Holderbaum et al. | |
| 2006/0234900 A1 | 10/2006 | Olson et al. | |
| 2006/0258556 A1 | 11/2006 | Holderbaum et al. | |
| 2006/0270580 A1 | 11/2006 | Smith et al. | |
| 2007/0000075 A1 | 1/2007 | Jungen | |
| 2007/0017553 A1 | 1/2007 | Neplenbroek et al. | |
| 2008/0020960 A1* | 1/2008 | Smith et al. | 510/267 |
| 2008/0099716 A1 | 5/2008 | Koefod | |
| 2008/0234164 A1 | 9/2008 | Tyborski | |
| 2008/0274928 A1 | 11/2008 | Smith et al. | |
| 2008/0274930 A1 | 11/2008 | Smith et al. | |
| 2008/0274932 A1 | 11/2008 | Smith et al. | |
| 2008/0274933 A1 | 11/2008 | Fernholz et al. | |
| 2008/0274939 A1 | 11/2008 | Monsrud et al. | |
| 2008/0276967 A1 | 11/2008 | Smith et al. | |
| 2008/0280800 A1 | 11/2008 | Smith et al. | |
| 2008/0287335 A1 | 11/2008 | Smith | |
| 2008/0300160 A1 | 12/2008 | Smith et al. | |
| 2009/0011125 A1 | 1/2009 | Hoerle et al. | |
| 2009/0054287 A1 | 2/2009 | Smith et al. | |
| 2009/0054290 A1 | 2/2009 | Fernholz et al. | |

FOREIGN PATENT DOCUMENTS

| | | |
|---|---|---|
| EP | 1253188 | 10/2002 |
| GB | 784750 | 12/1957 |
| GB | 1437950 | 6/1976 |
| JP | 4104885 | 4/1992 |
| JP | 10118638 | 5/1998 |
| JP | 2003-525104 | 8/2003 |
| JP | 2007-292389 | 11/2007 |
| KR | 810000367 | 4/1981 |
| KR | 10-2004-0019262 | 3/2004 |
| KR | 10-2006-0003294 | 1/2006 |
| WO | WO92/03529 | 3/1992 |
| WO | WO93/18140 | 9/1993 |
| WO | WO94/25583 | 11/1994 |
| WO | WO95/07791 | 3/1995 |
| WO | WO95/10591 | 4/1995 |
| WO | WO95/10615 | 4/1995 |
| WO | WO95/29979 | 11/1995 |
| WO | WO95/30010 | 11/1995 |
| WO | WO95/30011 | 11/1995 |
| WO | WO98/40455 | 9/1998 |
| WO | WO2006/128498 | 12/2006 |

OTHER PUBLICATIONS

Gibson, Aileen and Maniocha, Michael, "The Use of Magnesium Hydroxide Slurry for Biological Treatment of Municipal and Industrial Wastewater," Martin Marietta Magnesia Specialties, LLC, white paper, 7 pgs.

Kawaguchi, H. et al., "Crystallization of Inorganic Compounds in Polymer Solutions. Part I: Control of Shape and Form of Calcium Carbonate," Colloid Polym Sci, vol. 270, 1992, pp. 1176-1181.

Lee, Inhyung et al., "Nanoparticle-Directed Crystallization of Calcium Carbonate," Advanced Materials, Jul. 3, 2001, 4 pgs.

Loste, Eva et al., "The role of magnesium in stabilizing amorphous calcium carbonate and controlling calcite morpologies", Journal of Crystal Growth 254 (2003), pp. 206-218.

Meyer, H.J., "The Influence of Impurities on the Grown Rate of Calcite," Journal of Crystal Growth, vol. 66, 1984, pp. 639-646.

Takayuki, Saito and Takuhisa, Handa, "Improvement in the Water Recovery and Scale Prevention of an RO System," Ebara Engineering Review, vol. 199, 2003, pp. 30-34.

Woon-Kyoung Park, "Crystal Growth of Aragonite Precipitated Calcium Carbonate by Seeded Method,", Materials Science Forum vols. 544-545 (2007) pp. 693-696.

* cited by examiner

METHOD OF REDUCING CORROSION USING A WAREWASHING COMPOSITION

CROSS-REFERENCE TO RELATED APPLICATION

This application claims priority to U.S. Provisional Application Ser. No. 60/927,575 filed on May 4, 2007 and entitled "Compositions Containing Magnesium Salts and Methods of Using", the disclosure of which is incorporated herein by reference.

This application is also related to: U.S. patent application Ser. No. 12/114,486, entitled "Cleaning Compositions with Water Insoluble Conversion Agents and Methods of Making and Using Them"; U.S. patent application Ser. No. 12/114,355, entitled, "Composition For In Situ Manufacture Of Insoluble Hydroxide When Cleaning Hard Surfaces And For Use In Automatic Warewashing Machines, And Methods For Manufacturing And Using"; U.S. patent application Ser. No. 12/114,448, entitled "Water Treatment System and Downstream Cleaning Methods"; U.S. patent application Ser. No. 12/114,327, entitled "Water Soluble Magnesium Compounds as Cleaning Agents and Methods of Using Them"; U.S. patent application Ser. No. 12/114,513entitled "Cleaning Compositions Containing Water Soluble Magnesium Compounds and Methods of Using Them". now U.S. Pat. No. 7,749,329; U.S. patent application Ser. No. 12/114,428, entitled "MG++ Chemistry and Method for Fouling Inhibition in Heat Processing of Liquid Foods and Industrial Processes"; U.S. patent application Ser. No. 12/114,329, entitled "Compositions Including Hardness Ion and Gluconate and Methods Employing Them to Reduce Corrosion and Etch",now U.S. Pat No. 7,709,434; U.S. patent application Ser. No. 12/114,342, entitled "Compositions Including Hardness Ion and Silicate and Methods Employing Them to Reduce Corrosion and Etch", now U.S. Pat. No. 7,960,329; and U.S. patent application Ser. No. 12/114,364, entitled "Compositions Including Hardness Ion and Threshold Agent and Methods Employing Them to Reduce Corrosion and Etch", all commonly assigned to Ecolab, Inc., are filed on the same date as this application being May 2, 2008 and are all incorporated herein by reference for all purposes.

FIELD OF THE INVENTION

The present invention relates to warewashing compositions including a hardness ion (e.g., magnesium and calcium ions) as a corrosion inhibitor. Such compositions can be used to reduce corrosion or etching of glass, porcelain and ceramic. The present invention also relates to methods employing these warewashing compositions.

BACKGROUND OF THE INVENTION

The level of hardness in water can have a deleterious effect in many systems. For example, when hard water is used in conjunction with cleaning compositions, hard water can cause precipitation of hard water scale or components of a cleaning agent. In general, hard water refers to water having a level of calcium and magnesium ions in excess of about 100 ppm expressed in units of ppm calcium carbonate. Often, the molar ratio of calcium to magnesium in hard water is about 2:1 or about 3:1. Although most locations have hard water, water hardness tends to vary from one location to another.

Etching or corrosion of glass, porcelain and ceramic due to water hardness is a common problem in warewashing and surface cleaning. Water hardness can be addressed in a number of ways. For example, the water can be softened by replacing the calcium and the magnesium present in the water with sodium. The warewashing composition can also include builders or chelating agents at levels sufficient to handle the water hardness. Water softeners, however, break down on occasion or run out of material that provides the softening effect. In addition, certain environments may provide water having a hardness that exceeds the builder or chelating capacity of the warewashing detergent composition. As a result, free calcium ions may be available to attack active components of the composition, to cause corrosion or precipitation, or other deleterious affects. Accordingly, conventional cleaning compositions include additional ingredients to combat corrosion or etch.

It is entirely unexpected that a hardness ion would have a beneficial effect on reducing etching and/or corrosion of glass.

SUMMARY OF THE INVENTION

The present invention relates to compositions employing salts of magnesium, calcium and mixtures thereof as a corrosion inhibitor. The present compositions can reduce corrosion or etch of glass, porcelain and ceramic surfaces. The present invention also relates to methods employing these compositions.

In an embodiment, the present invention relates to a warewashing composition. This composition includes a cleaning agent having a detersive amount of a surfactant, an alkaline source in an amount effective to provide a use composition having a pH of at least about 8 when the use composition is measured at a solids concentration of about 0.5 wt %, and a corrosion inhibitor in an amount sufficient to reduce corrosion of glass when the warewashing detergent composition is combined with water of dilution at a dilution ratio of at least about 20:1 water of dilution to detergent composition to form a use composition. The corrosion inhibitor includes a salt of calcium, magnesium or a mixture of calcium and magnesium. The salt has a water solubility of less than about 0.5 wt. % in water at about 20° C. and atmospheric pressure so that the salt precipitates to form a protective layer on a substrate in contact with the use composition.

In an embodiment, the present invention relates to a method of cleaning an article and reducing corrosion to a surface of the article. The method includes providing a warewashing composition, contacting the warewashing composition with a diluent to form an aqueous composition and contacting the aqueous composition to the article to clean the article and reduce corrosion of a surface of the article. The warewashing composition includes a cleaning agent constituting between about 0.05 wt % and about 15 wt % of the warewashing composition, an alkaline source constituting between about 5 wt % and about 40 wt % of the warewashing composition and a corrosion inhibitor constituting between about 0.01 wt % and about 15 wt % of the warewashing composition. The corrosion inhibitor includes at least one of a water soluble magnesium salt, a water insoluble magnesium salt, a water soluble calcium salt and a water insoluble calcium salt.

In an embodiment, the present invention relates to a method of reducing corrosion of an article during cleaning. The method includes diluting a warewashing detergent composition with water to form a use composition and contacting the article with the use composition in an automatic dishwashing machine. The warewashing detergent composition is diluted at a ratio of at least about 20:1 water to warewashing detergent composition. The warewashing detergent composition includes a cleaning agent comprising a detersive amount of a surfactant, an alkaline source in an amount effective to provide a use composition having a pH of at least about 8 when measured at a solids concentration of about 0.5 wt %, and a corrosion inhibitor in an amount sufficient for reducing corrosion of glass. The corrosion inhibitor includes a salt of calcium, magnesium, or a mixture of calcium and magnesium and has a water solubility of less than about 0.5 wt % in water at about 20° C. and atmospheric pressure. The salt precipitates to form a protective layer on a article in contact with the use composition.

DETAILED DESCRIPTION OF THE INVENTION

So that the invention may be more readily understood, certain terms are first defined.

As used herein, the term "water soluble" refers to a compound that can be dissolved in water at a concentration of more than about 1 wt %.

As used herein, the terms "slightly soluble" or "slightly water soluble" refer to a compound that can be dissolved in water only to a concentration of 0.1 to 1.0 wt-%.

As used herein, the term "water insoluble" refers to a compound that can be dissolved in water only to a concentration of less than about 0.1% by weight.

As used herein, the terms "chelating agent" and "sequestrant" refer to a compound that forms a complex (soluble or not) with water hardness ions (from the wash water, soil and substrates being washed) in a specific molar ratio. Chelating agents that can form a water soluble complex include sodium tripolyphosphate (STPP), ethylenediamine tetracetic acid (EDTA), diethylenetriamine pentaacetic acid (DTPA), nitrilotriacetic (NTA), citrate and the like. Sequestrants that can form an insoluble complex include sodium triphosphate, zeolite A and the like. As used herein, the terms "chelating agent" and "sequestrant" are synonymous.

As used herein, the term "threshold agent" refers to a compound that inhibits crystallization of water hardness ions from solution, but that need not form a specific complex with the water hardness ions. This distinguishes a threshold agent from a chelating agent or sequestrant. Examples of threshold agents include, but are not limited to: a polyacrylate, a polymethacrylate, an olefin/maleic copolymer and the like.

As used herein, the term "phosphate-free" refers to a composition, mixture or ingredient that does not contain a phosphate or phosphate-containing compound or to which a phosphate or phosphate-containing compound has not been added. Should a phosphate or phosphate-containing compound be present through contamination of a phosphate-free composition, mixture or ingredient, the amount of phosphate shall be less than about 0.5 wt %. In an embodiment, the amount of phosphate is less than about 0.1 wt %. In an embodiment, the amount of phosphate is less than about 0.01 wt %.

As used herein, the term "phosphorus-free" refers to a composition, mixture or ingredient that does not contain phosphorus or a phosphorus-containing compound or to which phosphorus or a phosphorus-containing compound has not been added. Should phosphorus or a phosphorus-containing compound be present through contamination of a phosphorus-free composition, mixture or ingredient, the amount of phosphorus shall be less than about 0.5 wt %. In an embodiment, the amount of phosphorus is less than about 0.1 wt %. In an embodiment, the amount of phosphorus is less than about 0.01 wt %.

As used herein, the term "cleaning" means to perform or aid in soil removal, bleaching, microbial population reduction or combination thereof.

As used herein, the term "ware" includes items such as eating and cooking utensils, and other hard surfaces such as showers, sinks, toilets, bathtubs, countertops, windows, mirrors, transportation vehicles, and floors.

As used herein, the term "warewashing" refers to washing, cleaning or rinsing ware.

As used herein, the term "hard surface" includes showers, sinks, toilets, bathtubs, countertops, windows, mirrors, transportation vehicles, floors, and the like.

As used herein, the phrase "health care surface" refers to a surface of an instrument, a device, a cart, a cage, furniture, a structure, a building, or the like that is employed as part of a health care activity. Examples of health care surfaces include surfaces of medical or dental instruments, of medical or dental devices, of autoclaves and sterilizers, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.), or fabric surfaces, e.g., knit, woven, and non-woven surfaces (such as surgical garments, draperies, bed linens, bandages, etc.), or patient-care equipment (such as respirators, diagnostic equipment, shunts, body scopes, wheel chairs, beds, etc.), or surgical and diagnostic equipment. Health care surfaces include articles and surfaces employed in animal health care.

As used herein, the term "instrument" refers to the various medical or dental instruments or devices that can benefit from cleaning using water treated according to the methods of the present invention.

As used herein, the phrases "medical instrument," "dental instrument," "medical device," "dental device," "medical equipment," or "dental equipment" refer to instruments, devices, tools, appliances, apparatus, and equipment used in medicine or dentistry. Such instruments, devices, and equipment can be cold sterilized, soaked or washed and then heat sterilized, or otherwise benefit from cleaning using water treated according to the present invention. These various instruments, devices and equipment include, but are not limited to: diagnostic instruments, trays, pans, holders, racks, forceps, scissors, shears, saws (e.g. bone saws and their blades), hemostats, knives, chisels, rongeurs, files, nippers, drills, drill bits, rasps, burrs, spreaders, breakers, elevators, clamps, needle holders, carriers, clips, hooks, gouges, curettes, retractors, straightener, punches, extractors, scoops, keratomes, spatulas, expressors, trocars, dilators, cages, glassware, tubing, catheters, cannulas, plugs, stents, scopes (e.g., endoscopes, stethoscopes, and arthoscopes) and related equipment, and the like, or combinations thereof.

As used herein, the phrase "solid cleaning composition" refers to a cleaning composition in the form of a solid such as a powder, a flake, a granule, a pellet, a tablet, a lozenge, a puck, a briquette, a brick, a solid block, a unit dose or another solid form known to those of skill in the art. The term "solid" refers to the state of the detergent composition under the expected conditions of storage and use of the solid detergent composition. In general, it is expected that the detergent composition will remain in solid form when exposed to temperatures of up to about 100° F. and greater than about 120° F.

By the term "solid" as used to describe the processed composition, it is meant that the hardened composition will not flow perceptibly and will substantially retain its shape under moderate stress or pressure or mere gravity, as for example, the shape of a mold when removed from the mold, the shape of an article as formed upon extrusion from an extruder and the like. The degree of hardness of the solid cast composition can range from that of a fused solid block which is relatively dense and hard, for example, like concrete, to a consistency characterized as being malleable and sponge-like, similar to caulking material.

As used herein, weight percent (wt %), percent by weight, % by weight, and the like are synonyms that refer to the concentration of a substance as the weight of that substance divided by the total weight of the composition and multiplied by 100.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

Corrosion Inhibitor Warewashing Composition

The present invention relates to warewashing compositions including hardness ions (e.g., magnesium and calcium ions) as a corrosion inhibitor. Surprisingly, the inventors have discovered that warewashing compositions including a mixture of hardness ions can have a beneficial effect on protecting articles such as glass, ceramic or porcelain from corrosion in an automatic dishwashing or warewashing machine. Compositions including hardness ions reduce the rate of corrosion and etching of various articles. While the warewashing composition is discussed as being applied in automatic dishwashing or warewashing machines, the warewashing composition can be applied in any environment where it is desirable to reduce corrosion and/or etching of glass, ceramic or porcelain. For example, the warewashing composition can be used for bottle washing or as a manual cleaner for cleaning glasses, dishes, etc. in a sink.

The source of hardness ions is sufficiently water-soluble so that when the composition is combined with a diluent, such as water, the compounds dissolve. In this context, sufficiently water-soluble means that the source of hardness ions dissolve at a relatively quick rate in water. In an embodiment, the solubility of the source of hardness ions is at least about 0.5 wt % in water at about 20° C. and atmospheric pressure. In an embodiment, once solubilized, the hardness ions interact to form a salt having limited water solubility (e.g., even water insoluble). In this context, the phrase "limited water solubility" means that the salt has a tendency to precipitate from the solution. In an embodiment, a salt having limited water solubility has a solubility of less than about 0.5 wt % in water at about 20° C. and atmospheric pressure.

The water-insoluble salt may be formed in-situ when the diluent is added to the present composition or may be added to a liquid as a premade complex. Forming the water insoluble salt in situ can result in its more homogeneous dispersion in solution. Forming the water insoluble salt as a premade complex can allow use of lower concentrations while achieving the same level of effectiveness as forming the corrosion inhibitor in situ.

In an embodiment, the present compositions can include sources of water-soluble cations (e.g., two different cations) and a source of water-soluble anion. The water-soluble cations can be a mixture of hardness ions. The cations and anion can interact with each other to mitigate corrosion and etching of surfaces exposed to an alkalinity source or soft water. The water-soluble cations and the water-soluble anions can be provided as a mixture of distinct chemical entities (e.g., powders or granules of salts that have been mixed) that are combined by the addition of a diluent. Once combined with the diluent, the source of water-soluble cations and the source of water-soluble anion form cations and anions, respectively. The cations and anions interact to form a water-insoluble salt that precipitates onto the surface and forms a protective film. In general, the corrosion inhibitor can be used in any application where it is desirable to reduce surface corrosion, such as in a detergent composition.

The warewashing composition includes an effective amount of a corrosion inhibitor to provide a use composition exhibiting resistance to glass corrosion after multiple washings. In an embodiment, the aqueous composition includes water, a cleaning agent, an alkaline source, hardness ions as a corrosion inhibitor, and further ingredients that provide a beneficial property for a particular use. In certain embodiments, the present warewashing composition includes between about 0.05 wt % and 15 wt % cleaning agent, about 5 wt % and about 40 wt % alkaline source and about 0.01% and about 15% corrosion inhibitor; about 0.5 wt % and 10 wt % cleaning agent, about 10 wt % and about 30 wt % alkaline source and about 0.5% and about 10% corrosion inhibitor; and about 1 wt % and 5 wt % cleaning agent, about 15 wt % and about 20 wt % alkaline source and about 1% and about 5% corrosion inhibitor.

Without wishing to be bound by any particular theory, it is thought that, in certain embodiments, a salt formed from the hardness ions (e.g., magnesium and calcium) forms a protective film on the surface of articles exposed to the present composition. The protective film can be transparent or not visible to the unaided eye. Such a film can function as a protective layer and slow or prevent other components that may be present in solution from attacking and corroding the surface of the article. Thus, the film functions as a sacrificial layer and allows other components such as alkalinity sources, builders, or sequestrants, to attack and remove portions of the film, rather than attack the surface of the article. In some embodiments, the film is a relatively thin film that may be easily removed from the surface during subsequent cleaning so that a new film may be deposited on the surface to provide a new protective layer. Thus, it does not permanently build up on the surface and form an iridescent film or surface cloudiness. As a result, the precipitate film is available to protect the surface but can be removed and regenerated.

Although not limiting to the present invention, it is thought that, in certain embodiments, the corrosion inhibitor protects the surface by replacing ions extracted from the surface by an alkalinity source or builder in solution and/or by annealing the surface to remove surface hydroxyl groups. The protective film can degrade during subsequent wash cycles and can be continually regenerated as a result of precipitation of the salt.

Although not limiting to the present invention, it is thought that, in certain embodiments, the rate of deposition of salt is largely dependent on four conditions: (a) the level of water hardness of the water of dilution; (b) the presence of phosphorus-containing and non-phosphorus-containing compounds as builders or chelating agents; (c) the composition of the corrosion inhibitor; and (d) the ratio of cations to anions provided in the present composition. It is believed that the ratio of cations to anions may be manipulated such that the film deposited onto the surface is thick enough to protect against etching but is thin enough that it is relatively transparent and/or and substantially invisible to the naked eye such as by an individual casually inspecting the glass in normal use situations (e.g., at a dinner table). In selecting the ratio of cations to anions, numerous factors can be considered, including, but not limited to: the hardness level of the water, the cation source, the anion source, and the material of the surface to be protected.

Although not limiting to the present invention, it is thought that, in certain embodiments, it is believed that calcium and magnesium ions interact with anions at different rates to cause precipitation. In general, the reaction rates are as follows: calcium ions>magnesium ions. The reaction rates of the cations with the anions may be used to determine which cation source may be most efficient for forming a salt depending on the whether the diluent is hard water or soft water. By varying the amount of calcium ions and magnesium ions in solution, it is possible to provide a corrosion inhibitor that can handle various levels of water hardness. For example, when the diluent is hard water, it may be desirable to provide more magnesium ions to decrease the rate of precipitation. Similarly, when the diluent is soft water, it may be desirable to provide more calcium ions to increase the rate of precipitation.

Water Soluble Magnesium Salts

Suitable water soluble magnesium compounds for use in the present invention include those selected from: magnesium acetate, magnesium benzoate, magnesium bromide, magnesium bromate, magnesium chlorate, magnesium chloride, magnesium chromate, magnesium citrate, magnesium formate, magnesium hexafluorosilicate, magnesium iodate, magnesium iodide, magnesium lactate, magnesium molybdate, magnesium nitrate, magnesium perchlorate, magnesium phosphinate, magnesium salicylate, magnesium sulfate, magnesium sulfite, magnesium tartrate, magnesium thiosulfate, a hydrate thereof, and a mixture thereof. These salts can be provided as hydrated salts or anhydrous salts.

Suitable water soluble magnesium compounds include magnesium salts with an anion that also forms a soluble salt with calcium. Such salts include those selected from: magnesium acetate, magnesium benzoate, magnesium bromide, magnesium bromate, magnesium chlorate, magnesium chloride, magnesium chromate, magnesium formate, magnesium iodide, magnesium lactate, magnesium nitrate, magnesium perchlorate, magnesium phosphinate, magnesium salicylate, a hydrate thereof, and a mixture thereof. These salts can be provided as hydrated salts or anhydrous salts.

Water soluble magnesium compounds approved as GRAS for direct food contact include magnesium chloride and magnesium sulfate.

A cast or pressed solid block or puck of water soluble magnesium compound can also contain water insoluble magnesium compound. The water insoluble compound can slow the speed at which the water soluble magnesium compound dissolves to provide a useful solid cleaning composition. In certain embodiments, the ratio of water soluble to water insoluble magnesium compound can be about 1:10 to about 10:1, about 1:5 to about 5:1, or about 1:3 to about 3:1.

Water Insoluble Magnesium Salts

Suitable water insoluble magnesium compounds include those selected from: magnesium aluminate, magnesium borate, magnesium carbonate, magnesium carbonate hydroxide, magnesium ferrate, magnesium fluoride, magnesium hydroxide, magnesium mandelate, magnesium oxalate, magnesium oxide, magnesium phosphate, magnesium silicate, magnesium tungstate, a hydrate thereof, and a mixture thereof. These salts can be provided as hydrated compounds or anhydrous compounds.

In certain embodiments, suitable water insoluble magnesium compounds include calcium magnesium silicon oxide in a form selected from: akermanite, diopside, merwinite, and monticellite.

Water Soluble Calcium Salts

Suitable water soluble calcium salts include those selected from: calcium acetate, calcium benzoate, calcium bromate, calcium bromide, calcium chlorate, calcium chloride, calcium chromate, calcium dihydrogen phosphate, calcium dithionate, calcium formate, calcium gluconate, calcium glycerophosphate, calcium hydrogen sulfide, calcium iodide, calcium lactate, calcium metasilicate, calcium nitrate, calcium nitrite, calcium pantothenate, calcium perchlorate, calcium permanganate, calcium phosphate, calcium phosphinate, calcium salicylate, calcium succinate, a hydrate thereof, and a mixture thereof. These salts can be provided as hydrated compounds or anhydrous compounds.

Water Insoluble Calcium Salts

Water insoluble calcium salts include those selected from: calcium aluminate, calcium carbonate, calcium chromium (III) oxide, calcium citrate, calcium diphosphate, calcium disilicide, calcium fluoride, calcium hydrogen phosphate, calcium hydroxide, calcium iron oxide, calcium iodate, calcium laurate, calcium magnesium carbonate, calcium magnesium silicon oxide, calcium malonate, calcium metaborate, calcium metaphosphate, calcium molybdate, calcium oleate, calcium oxalate, calcium oxide, calcium palmitate, calcium phosphate, calcium silicate, calcium silicon oxide, calcium silicon titanium oxide, calcium stearate, calcium sulfate, calcium sulfide, calcium sulfite, calcium tartrate, calcium titanate, calcium tungstate, a hydrate thereof, and a mixture thereof. These salts can be provided as hydrated compounds or anhydrous compounds.

Diluent

Typically, the diluent used to dilute the present composition is water. It is expected that water available at one location may have a relatively low level of water hardness while water at another location may have a relatively high level of water hardness. It is expected that larger amounts of the present compositions may be employed without deleterious effects. Thus, the present composition can be provided such that the anti-corrosion and anti-etch properties of the corrosion inhibitor are present regardless of whether the diluent is soft water or hard water.

As used herein with respect to ingredients of the present compositions, water refers to water as obtained from a municipal or private water system, e.g., a public water supply or a well. The water can be softened water, hard water, city water, well water, water supplied by a municipal water system, water supplied by a private water system, treated water, or water directly from the system or well.

Additional Ingredients

Warewashing compositions made according to the invention may further include additional functional materials or additives that provide a beneficial property for a particular use. Examples of conventional additives include one or more of each of a detersive polymer, cleaning agent, rinse aid composition, softener, source of acidity, anti-corrosion agent, secondary hardening agent, solubility modifier, detergent filler, defoamer, anti-redeposition agent, antimicrobial, rinse aid composition, gluconate or system, aesthetic enhancing agent (i.e., dye, odorant, perfume), optical brightener, lubricant composition, bleaching agent or additional bleaching agent, enzyme, effervescent agent, activator for the source of alkalinity, other such additives or functional ingredients, and the like, and mixtures thereof.

Adjuvants and other additive ingredients will vary according to the type of composition being manufactured, and the intended end use of the composition. In certain embodiments, the composition includes as an additive one or more of a cleaning enzyme, detersive polymer, antimicrobial, activators for the source of alkalinity, or mixtures thereof.

pH Modifier

The pH modifier can be an organic or inorganic source of alkalinity or a pH buffering agent. The warewashing composition may include an effective amount of one or more alkaline sources to enhance cleaning of a substrate and improve soil removal performance of the composition. In general, an effective amount of one or more alkaline sources should be considered as an amount that provides a use composition having a pH of at least about 8. When the use composition has a pH of between about 8 and about 10, it can be considered mildly alkaline, and when the pH is greater than about 12, the use composition can be considered caustic. In general, it is desirable to provide the use composition as a mildly alkaline cleaning composition because it is considered to be more safe than caustic-based use compositions.

Nonlimiting examples of suitable pH modifiers include alkali metal hydroxides, alkali metal carbonates, alkanolamines, salts of weak organic acids, etc. Exemplary alkali metal hydroxides include, for example sodium hydroxide, lithium hydroxide, potassium hydroxide and calcium hydroxide. Exemplary metal carbonates include, but are not limited to: sodium carbonate, lithium carbonate, potassium carbonate, calcium carbonate (in aragonite form) and mixtures thereof. Suitable pH modifiers include acetate, formate, gluconate, and the like. Suitable pH modifiers have no or only weak calcium sequestration capability at the pH of the use solution. Alkali metal hydroxides may be added to the composition in the form of solid beads, dissolved in an aqueous solution, or a combination thereof. Alkali metal hydroxides are commercially available as a solid in the form of prilled solids or beads having a mix of particle sizes ranging from about 12-100 U.S. mesh, or as an aqueous solution, as for example, as about a 50 wt % and about a 73 wt % solution.

In general, it is expected that the concentrate will include the pH modifier in an amount of at least about 5 wt %, at least about 10 wt %, or at least about 15 wt %. In order to provide sufficient room for other components in the concentrate, the pH modifier can be provided in the concentrate in an amount of less than about 60 wt %. In addition, the alkaline source can be provided at a level of less than about 40 wt %, less than about 30 wt % or less than about 20 wt %. It is expected that the warewashing composition may provide a use composition that is useful at pH levels below about 8.

Organic Surfactants or Cleaning Agents

The composition can include at least one cleaning agent which can be a surfactant or surfactant system. A variety of surfactants can be used in a cleaning composition, including anionic, nonionic, cationic, and zwitterionic surfactants, which are commercially available from a number of sources. Suitable surfactants include nonionic surfactants. Suitable nonionic surfactants include low foaming non-ionic surfactants. For a discussion of surfactants, see Kirk-Othmer, Encyclopedia of Chemical Technology, Third Edition, volume 8, pages 900-912.

Nonionic surfactants are useful in the present solid compositions, include those having a polyalkylene oxide polymer as a portion of the surfactant molecule. Such nonionic surfactants include, for example, chlorine-, benzyl-, methyl-, ethyl-, propyl-, butyl- and other like alkyl-capped polyethylene and/or polypropylene glycol ethers of fatty alcohols; polyalkylene oxide free nonionics such as alkyl polyglycosides; sorbitan and sucrose esters and their ethoxylates; alkoxylated ethylene diamine; carboxylic acid esters such as glycerol esters, polyoxyethylene esters, ethoxylated and glycol esters of fatty acids, and the like; carboxylic amides such as diethanolamine condensates, monoalkanolamine condensates, polyoxyethylene fatty acid amides, and the like; and ethoxylated amines and ether amines commercially available from Tomah Corporation and other like nonionic compounds. Silicone surfactants such as the ABIL B8852 (Goldschmidt) can also be used.

Additional suitable nonionic surfactants having a polyalkylene oxide polymer portion include nonionic surfactants of $C_6$-$C_{24}$ alcohol ethoxylates (e.g., $C_6$-$C_{14}$ alcohol ethoxylates) having 1 to about 20 ethylene oxide groups (e.g., about 9 to about 20 ethylene oxide groups); $C_6$-$C_{24}$ alkylphenol ethoxylates (e.g., $C_8$-$C_{10}$ alkylphenol ethoxylates) having 1 to about 100 ethylene oxide groups (e.g., about 12 to about 20 ethylene oxide groups); $C_6$-$C_{24}$ alkylpolyglycosides (e.g., $C_6$-$C_{20}$ alkylpolyglycosides) having 1 to about 20 glycoside groups (e.g., about 9 to about 20 glycoside groups); $C_6$-$C_{24}$ fatty acid ester ethoxylates, propoxylates or glycerides; and $C_4$-$C_{24}$ mono or dialkanolamides.

Specific alcohol alkoxylates include alcohol ethoxylate propoxylates, alcohol propoxylates, alcohol propoxylate ethoxylate propoxylates, alcohol ethoxylate butoxylates, and the like; nonylphenol ethoxylate, polyoxyethylene glycol ethers and the like; and polyalkylene oxide block copolymers including an ethylene oxide/propylene oxide block copolymer such as those commercially available under the trademark PLURONIC (BASF-Wyandotte), and the like.

Suitable nonionic surfactants include low foaming nonionic surfactants. Examples of suitable low foaming nonionic surfactants include secondary ethoxylates, such as those sold under the trade name TERGITOL™, such as TERGITOL™ 15-S-7 (Union Carbide), Tergitol 15-S-3, Tergitol 15-S-9 and the like. Other suitable classes of low foaming nonionic surfactant include alkyl or benzyl-capped polyoxyalkylene derivatives and polyoxyethylene/polyoxypropylene copolymers.

A useful nonionic surfactant for use as a defoamer is nonylphenol having an average of 12 moles of ethylene oxide condensed thereon, it being end capped with a hydrophobic portion comprising an average of 30 moles of propylene oxide. Silicon-containing defoamers are also well-known and can be employed in the compositions and methods of the present invention.

Suitable amphoteric surfactants include amine oxide compounds having the formula:

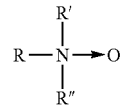

where R, R', R", and R'" are each a $C_1$-$C_{24}$ alkyl, aryl or aralkyl group that can optionally contain one or more P, O, S or N heteroatoms.

Another class of suitable amphoteric surfactants includes betaine compounds having the formula:

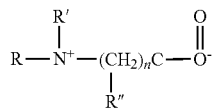

where R, R', R" and R'" are each a $C_1$-$C_{24}$ alkyl, aryl or aralkyl group that can optionally contain one or more P, O, S or N heteroatoms, and n is about 1 to about 10. Suitable surfactants include food grade surfactants, linear alkylbenzene sulfonic acids and their salts, and ethylene oxide/propylene oxide derivatives sold under the Pluronic™ trade name. Suitable surfactants include those that are compatible as an indirect or direct food additive or substance; especially those described in the Code of Federal Regulations (CFR), Title 21—Food and Drugs, parts 170 to 186 (which is incorporated herein by reference).

Anionic surfactants suitable for the present cleaning compositions, include, for example, carboxylates such as alkylcarboxylates (carboxylic acid salts) and polyalkoxycarboxylates, alcohol ethoxylate carboxylates, nonylphenol ethoxylate carboxylates, and the like; sulfonates such as alkylsulfonates, alkylbenzenesulfonates, alkylarylsulfonates, sulfonated fatty acid esters, and the like; sulfates such as sulfated alcohols, sulfated alcohol ethoxylates, sulfated alkylphenols, alkylsulfates, sulfosuccinates, alkylether sulfates, and the like; and phosphate esters such as alkylphosphate esters, and the like. Suitable anionics include sodium alkylarylsulfonate, alpha-olefin sulfonate, and fatty alcohol sulfates. Examples of suitable anionic surfactants include, for example, sodium dodecylbenzene sulfonic acid, potassium laureth-7 sulfate, and sodium tetradecenyl sulfonate.

The warewashing composition, when provided as a concentrate, can include the cleaning agent in a range of about 0.01 wt % to about 20 wt %, about 0.1 wt % to about 15 wt %, about 1 wt % to about 15 wt %, about 1.5 wt % to about 10 wt % and about 2 wt % to about 5 wt %. Additional exemplary ranges of surfactant in a concentrate include about 0.5 wt % to about 5 wt % and about 1 wt % to about 3 wt %.

Builder

If a builder is included in the present solid composition, it is a builder incapable of chelating a significant amount of or any of the magnesium. Zeolite 3A is an example of this type of builder. A purpose of such builder can be to increase the molar ratio of Mg/Ca in the use solution. This can reduce the amount of magnesium compound used as an ingredient in the solid composition.

Suitable inorganic builders include silicates, carbonates, sulfates, salts or acid forms thereof, mixtures thereof, and the like. Suitable silicates include zeolites and aluminosilicates, such as sodium aluminosilicate (SAS). Suitable carbonates include alkali metal salts, such as alkali metal carbonates, bicarbonates, and/or sesquicarbonates. In an embodiment, the compositions and methods of the present invention include a builder including an alkali metal carbonate.

The concentrate can include about 1 wt % to about 60 wt %, about 3 wt % to about 50 wt % and about 6 wt % to about 45 wt % of the builders. Additional ranges of the builders include about 3 wt % to about 20 wt %, about 6 wt % to about 15 wt %, about 25 wt % to about 50 wt % and about 35 wt % to about 45 wt %, depending upon whether the warewashing composition is provided as a liquid or as a solid.

Water conditioning polymers can be used as a form of builder. Exemplary water conditioning polymers include, but are not limited to, polycarboxylates. Exemplary polycarboxylates that can be used as builders and/or water conditioning polymers include, but are not limited to, those having pendant carboxylate ($-CO_2^-$) groups and include, for example, polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers and the like. For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein. The concentrate can include the water conditioning polymer in an amount of between about 0.1 wt % and about 5 wt %, and between about 0.2 wt % and about 2 wt %.

Chelating Agent or Sequestrant

The composition can include a sequestrant or chelating agent. In general, a chelating agent is a molecule capable of coordinating (i.e., binding) the metal ions commonly found in natural water to prevent the metal ions from interfering with the action of the other detersive ingredients of a cleaning composition. In general, chelating/sequestering agents can generally be referred to as a type of builder. The chelating/sequestering agent may also function as a threshold agent when included in an effective amount. Chelating agents or sequestrants include phosphonates, phosphates, aminocarboxylates and polycarboxylates.

Exemplary phosphonates include phosphonic acids and phosphonate salts, such as 1-hydroxy ethylidene-1,1-diphosphonic acid ($CH_3C(PO_3H_2)_2OH$) (HEDP), amino[tri(methylene phosphonic acid)] (ATMP), ethylene diamine[tetra methylene-phosphonic acid)], 2-phosphene butane-1,2,4-tricarboxylic acid (PBTC), as well as their alkyl metal salts, ammonium salts, or alkyloyl amine salts, such as mono, di, or tetra-ethanolamine salts. Phosphonates include phosphorus acid, $H_3PO_3$, and its salts.

Phosphonates include organic phosphonates. Organic phosphonates include low molecular weight phosphonopolycarboxylic acids, such as one having about 2-4 carboxylic acid moieties and about 1-3 phosphonic acid groups. Some examples of organic phosphonates include 1-hydroxyethane-1,1-diphosphonic acid: $CH_3C(OH)[PO(OH)_2]_2$; 1-phosphono-1-methylsuccinic acid, phosphonosuccinic acid; 2-phosphonobutane-1,2,4-tricarboxylic acid; other similar organic phosphonates; and salts thereof.

Phosphonates include amino phosphonates, phosphonates with an amino or imino (e.g. nitrogen) moiety. Such amino phosphonates include: ethylene diamine(tetramethylene phosphonates); nitrilotrismethylene phosphates; diethylenetriamine(pentamethylene phosphonates); aminotri(methylenephosphonic acid): $N[CH_2PO(OH)_2]_3$; aminotri(methylenephosphonate), sodium salt:

2-hydroxyethyliminobis(methylenephosphonic acid) $HOCH_2CH_2N[CH_2PO(OH)_2]_2$; diethylenetriaminepenta(methylenephosphonic acid) $(HO)_2POCH_2N[CH_2CH_2N[CH_2PO(OH)_2]_2]_2$; diethylenetriaminepenta(methylenephosphonate), sodium salt $C_9H_{(28-x)}N_3Na_xO_{15}P_5$ (x=7); hexamethylenediamine(tetramethylenephosphonate), potassium salt $C_{10}H_{(28-x)}N_2K_xO_{12}P_4$ (x=6); bis(hexamethylene)triamine(pentamethylenephosphonic acid) $(HO_2)POCH_2N[(CH_2)_6N[CH_2PO(OH)_2]_2]_2$. These amino phosphonates commonly contain alkyl or alkaline groups with less than 8 carbon atoms.

Commercially available phosphonates include those sold under the trade name DEQUEST® including, for example, 1-hydroxyethylidene-1,1-diphosphonic acid, available from Monsanto Industrial Chemicals Co., St. Louis, Mo., as DEQUEST® 2010; amino(tri(methylenephosphonic acid)), $(N[CH_2PO_3H_2]_3)$, available from Monsanto as DEQUEST® 2000; ethylenediamine[tetra(methylenephosphonic acid)] available from Monsanto as DEQUEST® 2041; and 2-phosphonobutane-1,2,4-tricarboxylic acid available from Mobay Chemical Corporation, Inorganic Chemicals Division, Pittsburgh, Pa., as Bayhibit AM; and amino[tri(methylene phosphonic acid)] (ATMP) available as Briquest 301-50A: Amino Tri (Methylene Phosphonic Acid)(ATMP), 50%, low ammonia from Albright & Wilson.

Phosphate-containing chelating agents or sequestrants include phosphates such as phosphoric acid and its salts, condensed or polyphosphates and their salts, and aminophosphates and their salts. Condensed or polyphosphates include tripolyphosphates, pyrophosphates, and glassy polymeric meta-phosphates; and their salts, such as alkali metal, ammonium, alkanolammonium, and mixed salts. Examples of such phosphates include sodium or potassium orthophosphate, sodium or potassium pyrophosphate, sodium or potassium tripolyphosphate, sodium hexametaphosphate, and the like. Aminophosphates include nitrilotrismethylene phosphates and other aminophosphates with alkyl or alkaline groups with less than 8 carbon atoms.

Aminocarboxylate chelating agents or sequestrants include acid and/or salt forms (e.g., alkali metal salts) of these compounds. Examples of aminocarboxylates include amino acetates and salts thereof. Amino acetates include: N-hydroxyethylaminodiacetic acid; hydroxyethylenediaminetetraacetic acid; nitrilotriacetic acid (NTA); ethylenediaminetetraacetic acid (EDTA); N-hydroxyethylethylenediaminetriacetic acid (HEDTA); diethylenetriaminepentaacetic acid (DTPA); and alanine-N,N-diacetic acid; n-hydroxyethyliminodiacetic acid; and the like; their alkali metal salts; and mixtures thereof.

Polycarboxylates include iminodisuccinic acids (IDS), sodium polyacrylates, citric acid, gluconic acid, oxalic acid, salts thereof, mixtures thereof, and the like. Additional polycarboxylates include citric or citrate-type chelating agent, polymeric polycarboxylate, acrylic or polyacrylic acid-type stabilizing agents. As used herein, polycarboxylate refers either or both of the acid and salt forms.

Examples of low molecular weight polycarboxylates chelating agents or sequestrants include: $C_4$-$C_{20}$-di-, -tri- and -tetracarboxylic acids, such as succinic acid, propanetricarboxylic acid, butanetetracarboxylic acid, cyclopentanetetracarboxylic acid and alkyl- and alkenylsuccinic acids with $C_2$-$C_{16}$-alkyl- or -alkenyl radicals; $C_4$-$C_{20}$-hydroxy carboxylic acids, such as malic acid, tartaric acid, gluconic acid, glutaric acid, citric acid, lactobionic acid and sucrose-mono-, -di- and -tricarboxylic acids; aminopolycarboxylates, such as nitrilotriacetic acid, methylglycinediacetic acid, alaninediacetic acid, ethylenediaminetetraacetic acid and serinediacetic acid.

Examples of oligomeric or polymeric polycarboxylates suitable as builders include: oligomaleic acids as described, for example, in EP-A-451 508 and EP-A-396 303; co- and terpolymers of unsaturated $C_4$-$C_8$-dicarboxylic acids, possible co-monomers which may be present being monoethylenically unsaturated monomers from group (i) in amounts of up to 95% by weight, from group (ii) in amounts of up to 60% by weight, from group (iii) in amounts of up to 20% by weight. Examples of suitable unsaturated $C_4$-$C_8$-dicarboxylic acids include maleic acid, fumaric acid, itaconic acid and citraconic acid.

The group (i) includes monoethylenically unsaturated $C_3$-$C_8$-monocarboxylic acids, such as acrylic acid, methacrylic acid, crotonic acid and vinylacetic acid, for example acrylic acid and methacrylic acid. Group (ii) includes monoethylenically unsaturated $C_2$-$C_{22}$-olefins, vinyl alkyl ethers with $C_1$-$C_8$-alkyl groups, styrene, vinyl esters of $C_1$-$C_8$-carboxylic acids, (meth)acrylamide and vinylpyrrolidone, for example $C_2$-$C_6$-olefins, vinyl alkyl ethers with $C_1$-$C_4$-alkyl groups, vinyl acetate and vinyl propionate. Group (iii) includes (meth)acrylic esters of $C_1$-$C_8$-alcohols, (meth)acrylnitrile, (meth)acrylamides of $C_1$-$C_8$-amines, N-vinylformamide and vinylimidazole.

If the polymers contain vinyl esters as monomers of group (ii) these can also be partially or completely hydrolyzed to vinyl alcohol structural units. Co- and terpolymers are disclosed, for example, in U.S. Pat. No. 3,887,806 and DE-A 43 13 909.

Copolymers of dicarboxylic acids include copolymers of maleic acid and acrylic acid in the ratio of 10:90 to 95:5 by weight. These can have a ratio of from 30:70 to 90:10 by weight, with molecular weights of from 10,000 to 150,000. Terpolymers of maleic acid, acrylic acid and a vinyl ester of a $C_1$-$C_3$-carboxylic acid can be employed with the ratio of from 10 (maleic acid):90 (acrylic acid+vinyl ester) to 95 (maleic acid):5 (acrylic acid+vinyl ester) by weight, for example, with the ratio of acrylic acid to vinyl ester in the range from 20:80 to 80:20 by weight. By way of further example, terpolymers of maleic acid, acrylic acid and vinyl acetate or vinyl propionate can have the ratio of from 20 (maleic acid): 80 (acrylic acid+vinyl ester) to 90 (maleic acid): 10 (acrylic acid+vinyl ester) by weight, for example, with the ratio of acrylic acid to the vinyl ester in the range from 30:70 to 70:30 by weight. Additional copolymers of maleic acid with $C_2$-$C_8$-olefins have the molar ratio from 40:60 to 80:20 for, for example, copolymers of maleic acid with ethylene, propylene or isobutene in the molar ratio 50:50.

Graft polymers of unsaturated carboxylic acids on low molecular weight carbohydrates or hydrogenated carbohydrates can be employed as polycarboxylate builders. Such graft polymers are described in, for example, U.S. Pat. No. 5,227,446, DE-A-44 15 623, DE-A-43 13 909. Suitable unsaturated carboxylic acids for graft polymers include, for example, maleic acid, fumaric acid, itaconic acid, citraconic acid, acrylic acid, methacrylic acid, crotonic acid and vinylacetic acid, and mixtures of acrylic acid and maleic acid, which are grafted on in amounts of from 40 to 95% of the weight of the component to be grafted. It is additionally possible for up to 30% by weight, based on the component to be grafted, of other monoethylenically unsaturated monomers to be present for modification. Suitable modifying monomers include the above-mentioned monomers of groups (ii) and (iii).

Suitable grafting bases include degraded polysaccharides, such as acidically or enzymatically degraded starches, inulins or cellulose, reduced (hydrogenated or reductively aminated) degraded polysaccharides, such as mannitol, sorbitol, aminosorbitol and glucamine, and polyalkylene glycols with molecular weights of up to 5,000 such as polyethylene glycols, ethylene oxide/propylene oxide or ethylene oxide/butylene oxide block copolymers, random ethylene oxide/propylene oxide or ethylene oxide/butylene oxide copolymers, alkoxylated mono- or polyhydric $C_1$-$C_{22}$-alcohols, see U.S. Pat. No. 4,746,456.

Graft polymers include grafted degraded or degraded reduced starches and grafted polyethylene oxides, employing from 20 to 80% by weight of monomers, based on the grafting component, in the graft polymerization. These can include a mixture of maleic acid and acrylic acid in the ratio of from 90:10 to 10:90 by weight for grafting.

Polyglyoxylic acids suitable as builders are described, for example, in EP-B-001 004, U.S. Pat. No. 5,399,286, DE-A-41 06 355 and EP-A-656 914. The end groups of the polyglyoxylic acids may have various structures.

Polyamidocarboxylic acids and modified polyamidocarboxylic acids suitable as builders are disclosed, for example, in EP-A-454 126, EP-B-511 037, WO 94/01486 and EP-A-581 452.

Additional chelating agents or sequestrants include polyaspartic acid or cocondensates of aspartic acid with other amino acids, $C_4$-$C_{25}$-mono- or -dicarboxylic acids and/or $C_4$-$C_{25}$-mono- or -diamines. Polyaspartic acids include those prepared in phosphorus-containing acids and modified with $C_6$-$C_{22}$-mono- or -dicarboxylic acids or with $C_6$-$C_{22}$-mono- or -diamines.

Condensation products of citric acid with hydroxy carboxylic acids or polyhydroxy compounds which are suitable as organic cobuilders are disclosed, for example, in WO 93/22362 and WO 92/16493. Carboxyl-containing condensates of this type normally have molecular weights of up to 10,000, for example, up to 5,000.

Polymeric polycarboxylates include, for example, polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers, and the like.

Activators

In some embodiments, the antimicrobial activity or bleaching activity of the composition can be enhanced by the addition of a material which, when the composition is placed in use, reacts with the active oxygen to form an activated component. For example, in some embodiments, a peracid or a peracid salt is formed. For example, in some embodiments, tetraacetylethylene diamine can be included within the composition to react with the active oxygen and form a peracid or a peracid salt that acts as an antimicrobial agent. Other examples of active oxygen activators include transition metals and their compounds, compounds that contain a carboxylic, nitrile, or ester moiety, or other such compounds known in the art. In an embodiment, the activator includes tetraacetylethylene diamine; transition metal; compound that includes carboxylic, nitrile, amine, or ester moiety; or mixtures thereof.

In some embodiments, an activator component can include in the range of 0.001 to 75 wt %, about 0.01 to about 20 wt %, or about 0.05 wt % to about 10 wt % of the composition.

In an embodiment, the activator for the source of alkalinity combines with the active oxygen to form an antimicrobial agent.

The solid composition typically remains stable even in the presence of activator of the source of alkalinity. In many compositions it would be expected to react with and destabilize or change the form of the source of alkalinity. In contrast, in an embodiment of the present invention, the composition remains solid; it does not swell, crack, or enlarge as it would if the source of alkalinity were reacting with the activator.

In an embodiment, the composition includes a solid block, and an activator material for the active oxygen is coupled to the solid block. The activator can be coupled to the solid block by any of a variety of methods for coupling one solid cleaning composition to another. For example, the activator can be in the form of a solid that is bound, affixed, glued or otherwise adhered to the solid block. Alternatively, the solid activator can be formed around and encasing the block. By way of further example, the solid activator can be coupled to the solid block by the container or package for the cleaning composition, such as by a plastic or shrink wrap or film.

Additional Bleaching Agents

Additional bleaching agents for use in inventive formulations for lightening or whitening a substrate, include bleaching compounds capable of liberating an active halogen species, such as $Cl_2$, $Br_2$, $I_2$, $ClO_2$, $BrO_2$, $IO_2$, $—OCl^-$, $—OBr^-$ and/or, $—OI^-$, under conditions typically encountered during the cleansing process. Suitable bleaching agents for use in the present cleaning compositions include, for example, chlorine-containing compounds such as a chlorite, a hypochlorite, chloramine. Suitable halogen-releasing compounds include the alkali metal dichloroisocyanurates, chlorinated trisodium phosphate, the alkali metal hypochlorites, alkali metal chlorites, monochloramine and dichloramine, and the like, and mixtures thereof. Encapsulated chlorine sources may also be used to enhance the stability of the chlorine source in the composition (see, for example, U.S. Pat. Nos. 4,618,914 and 4,830,773, the disclosure of which is incorporated by reference herein). A bleaching agent may also be an additional peroxygen or active oxygen source such as hydrogen peroxide, perborates, for example sodium perborate mono and tetrahydrate, sodium carbonate peroxyhydrate, phosphate peroxyhydrates, and potassium permonosulfate, with and without activators such as tetraacetylethylene diamine, and the like, as discussed above.

A cleaning composition may include a minor but effective additional amount of a bleaching agent above that already available from the stabilized source of alkalinity, e.g., about 0.1 wt % to about 60 wt %, about 1 wt % to about 20 wt %, about 3 wt % to about 8 wt %, and about 3 wt % to about 6 wt %.

Detergent Fillers

A cleaning composition may include an effective amount of one or more of a detergent filler which does not perform as a cleaning agent per se, but cooperates with the cleaning agent to enhance the overall processability of the composition. Examples of fillers suitable for use in the present cleaning compositions include sodium sulfate, sodium chloride, starch, sugars, $C_1$-$C_{10}$ alkylene glycols such as propylene glycol, and the like. A filler such as a sugar (e.g. sucrose) can aid dissolution of a solid composition by acting as a disintegrant. A detergent filler can be included in an amount up to about 1 wt % to about 20 wt % and between about 3 wt % and about 15 wt %.

Defoaming Agents

An effective amount of a defoaming agent for reducing the stability of foam may also be included in the present compositions. The composition can include about 0.01 wt % and about 3 wt %

Examples of defoaming agents suitable for use in the present compositions include silicone compounds such as silica dispersed in polydimethylsiloxane, EO/PO block copolymers, alcohol alkoxylates, fatty amides, hydrocarbon waxes, fatty acids, fatty esters, fatty alcohols, fatty acid soaps, ethoxylates, mineral oils, polyethylene glycol esters, alkyl phosphate esters such as monostearyl phosphate, and the like. A discussion of defoaming agents may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated by reference herein.

Anti-Redeposition Agents

The composition may also include an anti-redeposition agent capable of facilitating sustained suspension of soils in a cleaning solution and preventing the removed soils from being redeposited onto the substrate being cleaned. Examples of suitable anti-redeposition agents include fatty acid amides, fluorocarbon surfactants, complex phosphate esters, styrene maleic anhydride copolymers, and cellulosic derivatives such as hydroxyethyl cellulose, hydroxypropyl cellulose, and the like. A cleaning composition may include about 0.5 wt % to about 10 wt % and between about 1 wt % and about 5 wt % anti-redeposition agent.

Stabilizing Agents

The composition may also include a stabilizing agent. Examples of suitable stabilizing agents include, but are not limited to: borate, calcium/magnesium ions, propylene glycol, and mixtures thereof. The composition need not include a stabilizing agent, but when the composition includes a stabilizing agent, it can be included in an amount that provides the desired level of stability of the composition. Exemplary ranges of the stabilizing agent include up to about 20 wt %, between about 0.5 wt % and about 15 wt % and between about 2 wt % and about 10 wt %

Dispersants

The composition may also include a dispersant. Examples of suitable dispersants that can be used in the solid detergent composition include, but are not limited to: maleic acid/olefin copolymers, polyacrylic acid, and mixtures thereof. The composition need not include a dispersant, but when a dispersant is included it can be included in an amount that provides the desired dispersant properties. Suitable ranges of the dispersant in the composition can be up to about 20 wt %, between about 0.5 wt % and about 15 wt % or between about 2 wt % and about 9 wt %.

Enzymes

Enzymes that can be included in the compositions include those enzymes that aid in the removal of starch and/or protein stains. Suitable types of enzymes include, but are not limited to: proteases, alpha-amylases, and mixtures thereof. Suitable proteases that can be used include, but are not limited to: those derived from *Bacillus licheniformix, Bacillus lenus, Bacillus alcalophilus*, and *Bacillus amyloliquefacins*. Suitable alpha-amylases include *Bacillus subtilis, Bacillus amyloliquefaciens*, and *Bacillus licheniformis*. The composition need not include an enzyme, but when the composition includes an enzyme, it can be included in an amount that provides the desired enzymatic activity when the solid detergent composition is provided as a use composition. Suitable ranges of the enzyme in the composition include up to about 15 wt %, from about 0.5 wt % to about 10 wt %, and from about 1 wt % to about 5 wt %.

Silicates

Silicates can be included in the warewashing composition to provide for metal protection. Silicates are additionally known to provide alkalinity and additionally function as anti-redeposition agents. Exemplary silicates include, but are not limited to, sodium silicate and potassium silicate. The warewashing composition can be provided without silicates, but when silicates are included, they can be included in amounts that provide for desired metal protection. The concentrate can include silicates in amounts of at least about 1 wt %, at least about 5 wt %, at least about 10 wt % and at least about 15 wt %. In addition, in order to provide sufficient room for other components in the concentrate, the silicate component can be provided at a level of less than about 35 wt %, less than about 25 wt %, less than about 20 wt %, and less than about 15 wt %.

Water

The concentrate can include water. In general, it is expected that water may be present as a processing aid and may be removed or become water of hydration. It is expected that water may be present in both the liquid concentrate and in the solid concentrate. It is expected that the aqueous medium will help provide the components with a desired viscosity for processing. In addition, it is expected that the aqueous medium may help in the solidification process when it is desired to form the concentrate as a solid. In the case of the liquid concentrate, it is expected that water will be present in a range of between about 5 wt % and about 60 wt %, between about 10 wt % and about 35 wt % and between about 15 wt % and about 25 wt %.

When the concentrate is provided as a solid, it can be provided in the form of a block or pellet. It is expected that blocks will have a size of at least about 5 grams and can include a size of greater than about 50 grams. In the case of a solid concentrate, it is expected that the water will be present up to about 10 wt %, between about 0.1 wt % and about 10 wt %, between about 1 wt % and about 5 wt % and between about 2 wt % and about 3 wt %. It should be additionally appreciated that the water may be provided as deionized water or as softened water.

When the components that are processed to form the concentrate are processed into a block, it is expected that the components can be processed by extrusion techniques or casting techniques. In general, when the components are processed by extrusion techniques, it is believed that the composition can include a relatively smaller amount of water as an aid for processing compared with the casting techniques. In general, when preparing the solid by extrusion, it is expected that the composition can contain between about 2 wt % and about 10 wt % water. When preparing the solid by casting, it is expected that the amount of water can be provided in an amount of between about 20 wt % and about 40 wt %.

Processing Aid

Processing aids are materials which enhance the production process for the compositions. They can serve as drying agents, modify the rate of solidification, alter the transfer of water of hydration in the formula, or even act as the solidifying matrix itself. Processing aids can have some overlap with other functionalities in the formula. Nonlimiting examples include silica, alkali metal silicates, urea, polyethylene glycols, solid surfactants, sodium carbonate, potassium chloride, sodium sulfate, sodium hydroxide, water, etc. Which processing aid(s) is suitable varies with the manufacturing procedure and specific composition.

The processing aid can be present at amounts of from about 1 wt % to about 70 wt %, from about 2 wt % to about 50 wt % and from about 3 wt % to about 30 wt %.

Active Oxygen Compounds

The active oxygen compound acts to provide a source of active oxygen, but can also act to form at least a portion of the solidification agent. The active oxygen compound can be inorganic or organic, and can be a mixture thereof. Some examples of active oxygen compound include peroxygen compounds, and peroxygen compound adducts that are suitable for use in forming the binding agent.

Many active oxygen compounds are peroxygen compounds. Any peroxygen compound generally known and that can function, for example, as part of the binding agent can be used. Examples of suitable peroxygen compounds include inorganic and organic peroxygen compounds, or mixtures thereof.

Examples of inorganic active oxygen compounds include the following types of compounds or sources of these compounds, or alkali metal salts including these types of compounds, or forming an adduct therewith:

hydrogen peroxide;

group 1 (IA) active oxygen compounds, for example lithium peroxide, sodium peroxide, and the like;

group 2 (IIA) active oxygen compounds, for example magnesium peroxide, calcium peroxide, strontium peroxide, barium peroxide, and the like;

group 12 (IIB) active oxygen compounds, for example zinc peroxide, and the like;

group 13 (IIIA) active oxygen compounds, for example boron compounds, such as perborates, for example sodium perborate hexahydrate of the formula $Na_2[Br_2(O_2)_2(OH)_4].6H_2O$ (also called sodium perborate tetrahydrate and formerly written as $NaBO_3.4H_2O$); sodium peroxyborate tetrahydrate of the formula $Na_2Br_2(O_2)_2[(OH)_4].4H_2O$ (also called sodium perborate trihydrate, and formerly written as $NaBO_3.3H_2O$); sodium peroxyborate of the formula $Na_2[B_2(O_2)_2(OH)_4]$ (also called sodium perborate monohydrate and formerly written as $NaBO_3.H_2O$); and the like; e.g., perborate;

group 14 (IVA) active oxygen compounds, for example persilicates and peroxycarbonates, which are also called percarbonates, such as persilicates or peroxycarbonates of alkali metals; and the like; e.g., percarbonate, e.g., persilicate;

group 15 (VA) active oxygen compounds, for example peroxynitrous acid and its salts; peroxyphosphoric acids and their salts, for example, perphosphates; and the like; e.g., perphosphate;

group 16 (VIA) active oxygen compounds, for example peroxysulfuric acids and their salts, such as peroxymonosulfuric and peroxydisulfuric acids, and their salts, such as persulfates, for example, sodium persulfate; and the like; e.g., persulfate;

group VIIa active oxygen compounds such as sodium periodate, potassium perchlorate and the like.

Other active inorganic oxygen compounds can include transition metal peroxides; and other such peroxygen compounds, and mixtures thereof.

In certain embodiments, the compositions and methods of the present invention employ certain of the inorganic active oxygen compounds listed above. Suitable inorganic active oxygen compounds include hydrogen peroxide, hydrogen peroxide adduct, group 111A active oxygen compounds, group VIA active oxygen compound, group VA active oxygen compound, group VIIA active oxygen compound, or mixtures thereof. Examples of such inorganic active oxygen compounds include percarbonate, perborate, persulfate, perphosphate, persilicate, or mixtures thereof. Hydrogen peroxide presents an example of an inorganic active oxygen compound. Hydrogen peroxide can be formulated as a mixture of hydrogen peroxide and water, e.g., as liquid hydrogen peroxide in an aqueous solution. The mixture of solution can include about 5 wt % to about 40 wt % hydrogen peroxide or about 5 wt % to about 50 wt % hydrogen peroxide.

In an embodiment, the inorganic active oxygen compounds include hydrogen peroxide adduct. For example, the inorganic active oxygen compounds can include hydrogen peroxide, hydrogen peroxide adduct, or mixtures thereof. Any of a variety of hydrogen peroxide adducts are suitable for use in the present compositions and methods. For example, suitable hydrogen peroxide adducts include percarbonate salt, urea peroxide, peracetyl borate, an adduct of $H_2O_2$ and polyvinyl pyrrolidone, sodium percarbonate, potassium percarbonate, mixtures thereof, or the like. Suitable hydrogen peroxide adducts include percarbonate salt, urea peroxide, peracetyl borate, an adduct of $H_2O_2$ and polyvinyl pyrrolidone, or mixtures thereof. Suitable hydrogen peroxide adducts include sodium percarbonate, potassium percarbonate, or mixtures thereof, e.g., sodium percarbonate.

Any of a variety of organic active oxygen compounds can be employed in the compositions and methods of the present invention. For example, the organic s active oxygen compound can be a peroxycarboxylic acid, such as a mono- or di-peroxycarboxylic acid, an alkali metal salt including these types of compounds, or an adduct of such a compound. Suitable peroxycarboxylic acids include $C_1$-$C_{24}$ peroxycarboxylic acid, salt of $C_1$-$C_{24}$ peroxycarboxylic acid, ester of $C_1$-$C_{24}$ peroxycarboxylic acid, diperoxycarboxylic acid, salt of diperoxycarboxylic acid, ester of diperoxycarboxylic acid, or mixtures thereof.

Suitable peroxycarboxylic acids include $C_1$-$C_{10}$ aliphatic peroxycarboxylic acid, salt of $C_1$-$C_{10}$ aliphatic peroxycarboxylic acid, ester of $C_1$-$C_{10}$ aliphatic peroxycarboxylic acid, or mixtures thereof; e.g., salt of or adduct of peroxyacetic acid; e.g., peroxyacetyl borate. Suitable diperoxycarboxylic acids include $C_4$-$C_{10}$ aliphatic diperoxycarboxylic acid, salt of $C_4$-$C_{10}$ aliphatic diperoxycarboxylic acid, or ester of $C_4$-$C_{10}$ aliphatic diperoxycarboxylic acid, or mixtures thereof; e.g., a sodium salt of perglutaric acid, of persuccinic acid, of peradipic acid, or mixtures thereof.

Organic active oxygen compounds include other acids including an organic moiety. Suitable organic active oxygen compounds include perphosphonic acids, perphosphonic acid salts, perphosphonic acid esters, or mixtures or combinations thereof.

Active oxygen compound adducts include any generally known and that can function, for example, as a source of active oxygen and as part of the solidified composition. Hydrogen peroxide adducts, or peroxyhydrates, are suitable. Some examples of source of alkalinity adducts include the following: alkali metal percarbonates, for example sodium percarbonate (sodium carbonate peroxyhydrate), potassium percarbonate, rubidium percarbonate, cesium percarbonate, and the like; ammonium carbonate peroxyhydrate, and the like; urea peroxyhydrate, peroxyacetyl borate; an adduct of $H_2O_2$ polyvinyl pyrrolidone, and the like, and mixtures of any of the above.

Antimicrobials

Antimicrobial agents are chemical compositions that can be used in a solid functional material that alone, or in combination with other components, act to reduce or prevent microbial contamination and deterioration of commercial products material systems, surfaces, etc. In some aspects, these materials fall in specific classes including phenolics, halogen compounds, quaternary ammonium compounds, metal derivatives, amines, alkanol amines, nitro derivatives, analides, organosulfur and sulfur-nitrogen compounds and miscellaneous compounds.

It should also be understood that the source of alkalinity used in the formation of compositions embodying the invention also act as antimicrobial agents, and can even provide sanitizing activity. In fact, in some embodiments, the ability of the source of alkalinity to act as an antimicrobial agent reduces the need for secondary antimicrobial agents within the composition. For example, percarbonate compositions have been demonstrated to provide excellent antimicrobial action. Nonetheless, some embodiments incorporate additional antimicrobial agents.

The given antimicrobial agent, depending on chemical composition and concentration, may simply limit further proliferation of numbers of the microbe or may destroy all or a portion of the microbial population. The terms "microbes" and "microorganisms" typically refer primarily to bacteria, virus, yeast, spores, and fungus microorganisms. In use, the antimicrobial agents are typically formed into a solid functional material that when diluted and dispensed, optionally, for example, using an aqueous stream forms an aqueous disinfectant or sanitizer composition that can be contacted with a variety of surfaces resulting in prevention of growth or the killing of a portion of the microbial population. A three log reduction of the microbial population results in a sanitizer composition. The antimicrobial agent can be encapsulated, for example, to improve its stability.

Common antimicrobial agents include, for example, phenolic antimicrobials such as pentachlorophenol, orthophenylphenol, a chloro-p-benzylphenol and p-chloro-m-xylenol. Halogen containing antibacterial agents include, for example, sodium trichloroisocyanurate, sodium dichloro isocyanate (anhydrous or dihydrate), iodine-poly(vinylpyrrolidinone) complexes, bromine compounds such as 2-bromo-2-nitropropane-1,3-diol, and quaternary antimicrobial agents such as benzalkonium chloride, didecyldimethyl ammonium chloride, choline diiodochloride and tetramethyl phosphonium tribromide. Other antimicrobial compositions such as hexahydro-1,3,5-tris(2-hydroxyethyl)-s-triazine, dithiocarbamates such as sodium dimethyldithiocarbamate, and a variety of other materials are known in the art for their antimicrobial properties. In some embodiments, an antimicrobial component, such as TAED can be included in the range of from 0.001 wt % to about 75 wt % of the composition, from about 0.01 wt % to about 20 wt %, or from about 0.05 wt % to about 10 wt %.

If present in compositions, the additional antimicrobial agent can constitute between about 0.01 wt % and about 30 wt % of the composition, between about 0.05 wt % and about 10 wt %, or between about 0.1 wt % and about 5 wt %. In a use solution the additional antimicrobial agent can be between about 0.001 wt % and about 5 wt % of the composition, between about 0.01 wt % and about 2 wt %, or between about 0.05 wt % and about 0.5 wt %.

Rinse Aid Functional Materials

Functional materials of the invention can include a formulated rinse aid composition containing a wetting or sheeting agent combined with other optional ingredients in a solid made using the complex of the invention. The rinse aid component of the present invention can include a water soluble or dispersible low foaming organic material capable of reducing the surface tension of the rinse water to promote sheeting action and to prevent spotting or streaking caused by beaded water after rinsing is completed. This is often used in warewashing processes. Such sheeting agents are typically organic surfactant-like materials having a characteristic cloud point. The cloud point of the surfactant rinse or sheeting agent is defined as the temperature at which about a 1 wt % aqueous solution of the surfactant turns cloudy when warmed.

There are two general types of rinse cycles in commercial warewashing machines, a first type generally considered a sanitizing rinse cycle uses rinse water at a temperature of about 180° F., about 80° C. or higher. A second type of non-sanitizing machines uses a lower temperature non-sanitizing rinse, typically at a temperature of about 125° F., about 50° C. or higher. Surfactants useful in these applications are aqueous rinses having a cloud point greater than the available hot service water. Accordingly, the lowest useful cloud point measured for the surfactants of the invention is approximately 40° C. The cloud point can also be about 60° C. or higher, about 70° C. or higher, about 80° C. or higher, etc., depending on the use locus hot water temperature and the temperature and type of rinse cycle.

Suitable sheeting agents, typically include a polyether compound prepared from ethylene oxide, propylene oxide, or a mixture in a homopolymer or block or heteric copolymer structure. Such polyether compounds are known as polyalkylene oxide polymers, polyoxyalkylene polymers or polyalkylene glycol polymers. Such sheeting agents require a region of relative hydrophobicity and a region of relative hydrophilicity to provide surfactant properties to the molecule. Such sheeting agents have a molecular weight in the range of about 500 to about 15,000. Certain types of (PO)(EO) polymeric rinse aids have been found to be useful containing at least one block of poly(PO) and at least one block of poly(EO) in the polymer molecule. Additional blocks of poly(EO), poly PO or random polymerized regions can be formed in the molecule.

Particularly useful polyoxypropylene polyoxyethylene block copolymers are those including a center block of polyoxypropylene units and blocks of polyoxyethylene units to each side of the center block. Such polymers have the formula shown below:

$$(EO)_n\text{—}(PO)_m\text{-}(EO)_n$$

wherein n is an integer of 20 to 60, each end is independently an integer of about 10 to about 130. Another useful block copolymer are block copolymers having a center block of polyoxyethylene units and blocks of polyoxypropylene to each side of the center block. Such copolymers have the formula:

$$(PO)_n\text{-}(EO)_m\text{—}(PO)_n$$

wherein m is an integer of about 15 to about 175 and each end are independently integers of about 10 to about 30. The solid functional materials of the invention can often use a hydrotrope to aid in maintaining the solubility of sheeting or wetting agents. Hydrotropes can be used to modify the aqueous solution creating increased solubility for the organic material. Suitable hydrotropes are low molecular weight aromatic sulfonate materials such as xylene sulfonates and dialkyldiphenyl oxide sulfonate materials.

In an embodiment, compositions according to the present invention provide desirable rinsing properties in ware washing without employing a separate rinse agent in the rinse cycle. For example, good rinsing occurs using such compositions in the wash cycle when rinsing employs just soft water.

Hardening Agents

The compositions may also include a hardening agent in addition to, or in the form of, the builder. A hardening agent is a compound or system of compounds, organic or inorganic, which significantly contributes to the uniform solidification of the composition. The hardening agents should be compatible with the cleaning agent and other active ingredients of the composition and should be capable of providing an effective amount of hardness and/or aqueous solubility to the processed detergent composition. The hardening agents should also be capable of forming a homogeneous matrix with the cleaning agent and other ingredients when mixed and solidified to provide a uniform dissolution of the cleaning agent from the composition during use.

The amount of hardening agent included in the composition will vary according to factors including, but not limited to: the type of composition being prepared, the ingredients of the composition, the intended use of the composition, the quantity of dispensing solution applied to the detergent composition over time during use, the temperature of the dispensing solution, the hardness of the dispensing solution, the physical size of the composition, the concentration of the other ingredients, and the concentration of the cleaning agent in the composition. The amount of the hardening agent included in the composition should be effective to combine with the cleaning agent and other ingredients of the composition to form a homogeneous mixture under continuous mixing conditions and a temperature at or below the melting temperature of the hardening agent.

The hardening agent may also form a matrix with the cleaning agent and other ingredients which will harden to a solid form under ambient temperatures of about 30° C. to about 50° C., particularly about 35° C. to about 45° C., after mixing ceases and the mixture is dispensed from the mixing system, within about 1 minute to about 3 hours, particularly about 2 minutes to about 2 hours, and particularly about 5 minutes to about 1 hour. A minimal amount of heat from an external source may be applied to the mixture to facilitate processing of the mixture. The amount of the hardening agent included in the detergent composition should be effective to provide a desired hardness and desired rate of controlled solubility of the processed composition when placed in an aqueous medium to achieve a desired rate of dispensing the cleaning agent from the solidified composition during use.

The hardening agent may be an organic or an inorganic hardening agent. A particular organic hardening agent is a polyethylene glycol (PEG) compound. The solidification rate of detergent compositions comprising a polyethylene glycol hardening agent will vary, at least in part, according to the amount and the molecular weight of the polyethylene glycol added to the composition. Examples of suitable polyethylene glycols include, but are not limited to: solid polyethylene glycols of the general formula $H(OCH_2CH_2)_nOH$, where n is greater than about 15, more particularly about 30 to about 1700. Typically, the polyethylene glycol is a solid in the form of a free-flowing powder or flakes, having a molecular weight of about 1,000 to about 100,000, particularly having a molecular weight of at least about 1,450 to about 20,000, more particularly between about 1,450 to about 8,000. The polyethylene glycol is present at a concentration of from about 1 wt % to about 75 wt % and particularly about 3 wt % to about 15 wt %. Suitable polyethylene glycol compounds include, for example, PEG 4000, PEG 1450, and PEG 8000 among others, with PEG 4000 and PEG 8000 being most preferred. An example of a commercially available solid polyethylene glycol includes, but is not limited to: CARBOWAX, available from Union Carbide Corporation, Houston, Tex.

Particular inorganic hardening agents are hydratable inorganic salts, including, for example, sulfates, acetates, and bicarbonates. In an exemplary embodiment, the inorganic hardening agents are present at concentrations of up to about 50 wt %, particularly from about 5 wt % to about 25 wt %, and more particularly from about 5 wt % to about 15 wt %.

Urea particles may also be employed as hardeners in the detergent compositions. The solidification rate of the compositions will vary, at least in part, to factors including, but not limited to: the amount, the particle size, and the shape of the urea added to the detergent composition. For example, a particulate form of urea may be combined with a cleaning agent and other ingredients, as well as a minor but effective amount of water. The amount and particle size of the urea is effective to combine with the cleaning agent and other ingredients to form a homogeneous mixture without the application of heat from an external source to melt the urea and other ingredients to a molten stage. The amount of urea included in the solid detergent composition should be effective to provide a desired hardness and desired rate of solubility of the composition when placed in an aqueous medium to achieve a desired rate of dispensing the cleaning agent from the solidified composition during use. In an exemplary embodiment, the detergent composition includes between about 5 wt % and about 90 wt % urea, particularly between about 8 wt % and about 40 wt % urea, and more particularly between about 10 wt % and about 30 wt % urea.

The urea may be in the form of prilled beads or powder. Prilled urea is generally available from commercial sources as a mixture of particle sizes ranging from about 8-15 U.S. mesh, as for example, from Arcadian Sohio Company, Nitrogen Chemicals Division. A prilled form of urea is milled to reduce the particle size to about 50 U.S. mesh to about 125 U.S. mesh, particularly about 75-100 U.S. mesh, particularly using a wet mill such as a single or twin-screw extruder, a Teledyne mixer, a Ross emulsifier, and the like.

Secondary Hardening Agents/Solubility Modifiers The present compositions may include a minor but effective amount of a secondary hardening agent, as for example, an amide such stearic monoethanolamide or lauric diethanolamide, or an alkylamide, and the like; a solid polyethylene glycol, or a solid EO/PO block copolymer, and the like; starches that have been made water-soluble through an acid or alkaline treatment process; various inorganics that impart solidifying properties to a heated composition upon cooling, and the like. Such compounds may also vary the solubility of the composition in an aqueous medium during use such that the cleaning agent and/or other active ingredients may be dispensed from the solid composition over an extended period of time. The composition may include a secondary hardening agent in an amount of from about 5 wt % to about 20 wt % or from about 10 wt % to about 15 wt %.

Thickeners

The compositions can include a rheology modifier or a thickener. The rheology modifier may provide the following functions: increasing the viscosity of the compositions; increasing the particle size of liquid use solutions when dispensed through a spray nozzle; providing the use solutions with vertical cling to surfaces; providing particle suspension within the use solutions; or reducing the evaporation rate of the use solutions.

The rheology modifier may provide a use composition that is pseudo plastic, in other words the use composition or material when left undisturbed (in a shear mode), retains a high viscosity. However, when sheared, the viscosity of the material is substantially but reversibly reduced. After the shear action is removed, the viscosity returns. These properties permit the application of the material through a spray head. When sprayed through a nozzle, the material undergoes shear as it is drawn up a feed tube into a spray head under the influence of pressure and is sheared by the action of a pump in a pump action sprayer. In either case, the viscosity can drop to a point such that substantial quantities of the material can be applied using the spray devices used to apply the material to a soiled surface. However, once the material comes to rest on a soiled surface, the materials can regain high viscosity to ensure that the material remains in place on the soil. In an embodiment, the material can be applied to a surface resulting in a substantial coating of the material that provides the cleaning components in sufficient concentration to result in lifting and removal of the hardened or baked-on soil. While in contact with the soil on vertical or inclined surfaces, the thickeners in conjunction with the other components of the cleaner minimize dripping, sagging, slumping or other movement of the material under the effects of gravity. The material should be formulated such that the viscosity of the material is adequate to maintain contact substantial quantities of the film of the material with the soil for at least a minute, five minutes or more.

Examples of suitable thickeners or rheology modifiers are polymeric thickeners including, but not limited to: polymers or natural polymers or gums derived from plant or animal sources. Such materials may be polysaccharides such as large polysaccharide molecules having substantial thickening capacity. Thickeners or rheology modifiers also include clays.

A substantially soluble polymeric thickener can be used to provide increased viscosity or increased conductivity to the use compositions. Examples of polymeric thickeners for the aqueous compositions of the invention include, but are not limited to: carboxylated vinyl polymers such as polyacrylic acids and sodium salts thereof, ethoxylated cellulose, polyacrylamide thickeners, cross-linked, xanthan compositions, sodium alginate and algin products, hydroxypropyl cellulose, hydroxyethyl cellulose, and other similar aqueous thickeners that have some substantial proportion of water solubility. Examples of suitable commercially available thickeners include, but are not limited to: Acusol, available from Rohm & Haas Company, Philadelphia, Pa.; and Carbopol, available from B.F. Goodrich, Charlotte, N.C.

Examples of suitable polymeric thickeners include, but not limited to: polysaccharides. An example of a suitable commercially available polysaccharide includes, but is not limited to, Diutan, available from Kelco Division of Merck, San Diego, Calif. Thickeners for use in the solid detergent compositions further include polyvinyl alcohol thickeners, such as, fully hydrolyzed (greater than 98.5 mol acetate replaced with the —OH function).

An example of a suitable polysaccharide includes, but is not limited to, xanthans. Such xanthan polymers are suitable due to their high water solubility, and great thickening power. Xanthan is an extracellular polysaccharide of *Xanthomonas campestras*. Xanthan may be made by fermentation based on corn sugar or other corn sweetener by-products. Xanthan includes a poly beta-(1-4)-D-Glucopyranosyl backbone chain, similar to that found in cellulose. Aqueous dispersions of xanthan gum and its derivatives exhibit novel and remarkable rheological properties. Low concentrations of the gum have relatively high viscosities which permit it to be used economically. Xanthan gum solutions exhibit high pseudo plasticity, i.e. over a wide range of concentrations, rapid shear thinning occurs that is generally understood to be instantaneously reversible. Non-sheared materials have viscosities that appear to be independent of the pH and independent of temperature over wide ranges. Suitable xanthan materials include crosslinked xanthan materials. Xanthan polymers can be crosslinked with a variety of known covalent reacting crosslinking agents reactive with the hydroxyl functionality of large polysaccharide molecules and can also be crosslinked using divalent, trivalent or polyvalent metal ions. Such crosslinked xanthan gels are disclosed in U.S. Pat. No. 4,782,901, which is herein incorporated by reference. Suitable crosslinking agents for xanthan materials include, but are not limited to: metal cations such as $Al^{+3}$, $Fe^{+3}$, $Sb^{+3}$, $Zr^{+4}$ and other transition metals. Examples of suitable commercially available xanthans include, but are not limited to: KELTROL®, KELZAN® AR, KELZAN® D35, KELZAN® S, KELZAN® XZ, available from Kelco Division of Merck, San Diego, Calif. Known organic crosslinking agents can also be used. A suitable crosslinked xanthan is KELZAN® AR, which provides a pseudo plastic use solution that can produce large particle size mist or aerosol when sprayed.

Optical Brighteners

Optical brightener is also referred to as fluorescent whitening agents or fluorescent brightening agents provide optical compensation for the yellow cast in fabric substrates. With optical brighteners yellowing is replaced by light emitted from optical brighteners present in the area commensurate in scope with yellow color. The violet to blue light supplied by the optical brighteners combines with other light reflected from the location to provide a substantially complete or enhanced bright white appearance. This additional light is produced by the brightener through fluorescence. Optical brighteners absorb light in the ultraviolet range 275 through 400 nm. and emit light in the ultraviolet blue spectrum 400-500 nm.

Fluorescent compounds belonging to the optical brightener family are typically aromatic or aromatic heterocyclic materials often containing condensed ring system. An important feature of these compounds is the presence of an uninterrupted chain of conjugated double bonds associated with an aromatic ring. The number of such conjugated double bonds is dependent on substituents as well as the planarity of the fluorescent part of the molecule. Most brightener compounds are derivatives of stilbene or 4,4'-diamino stilbene, biphenyl, five membered heterocycles (triazoles, oxazoles, imidazoles, etc.) or six membered heterocycles (cumarins, naphthalamides, triazines, etc.). The choice of optical brighteners for use in detergent compositions will depend upon a number of factors, such as the type of detergent, the nature of other components present in the detergent composition, the temperature of the wash water, the degree of agitation, and the ratio of the material washed to the tub size. The brightener selection is also dependent upon the type of material to be cleaned, e.g., cottons, synthetics, etc. Since most laundry detergent products are used to clean a variety of fabrics, the detergent compositions should contain a mixture of brighteners which are effective for a variety of fabrics. It is of course necessary that the individual components of such a brightener mixture be compatible.

Optical brighteners useful in the present invention are commercially available and will be appreciated by those skilled in the art. Commercial optical brighteners which may be useful in the present invention can be classified into subgroups, which include, but are not necessarily limited to, derivatives of stilbene, pyrazoline, coumarin, carboxylic acid, methinecyanines, dibenzothiophene-5,5-dioxide, azoles, 5- and 6-membered-ring heterocycles and other miscellaneous agents. Examples of these types of brighteners are disclosed in "The Production and Application of Fluorescent Brightening Agents", M. Zahradnik, Published by John Wiley & Sons, New York (1982), the disclosure of which is incorporated herein by reference.

Stilbene derivatives which may be useful in the present invention include, but are not necessarily limited to, derivatives of bis(triazinyl)amino-stilbene; bisacylamino derivatives of stilbene; triazole derivatives of stilbene; oxadiazole derivatives of stilbene; oxazole derivatives of stilbene; and styryl derivatives of stilbene.

For laundry cleaning or sanitizing compositions, suitable optical brighteners include stilbene derivatives, which can be employed at concentrations of up to 1 wt %.

Dyes/Odorants

Various dyes, odorants including perfumes, and other aesthetic enhancing agents may also be included in the composition. Dyes may be included to alter the appearance of the composition, as for example, Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keyston Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), and the like.

Fragrances or perfumes that may be included in the compositions include, for example, terpenoids such as citronellol, aldehydes such as amyl cinnamaldehyde, a jasmine such as ClS-jasmine or jasmal, vanillin, and the like.

Use Compositions

The present warewashing compositions include concentrate compositions and use compositions. In general, a concentrate refers to a composition that is intended to be diluted with water to provide a use solution that contacts an object to provide the desired cleaning, rinsing, or the like. The warewashing composition that contacts the articles to be washed in an automatic dishwashing process can be referred to as the use composition. The use solution can include additional functional ingredients at a level suitable for cleaning, rinsing, or the like. In an embodiment, the use solution includes additional functional ingredients of from about 0.05 wt % to about 75 wt %.

A use solution may be prepared from the concentrate by diluting the concentrate with water at a dilution ratio that provides a use solution having desired detersive properties. The water that is used to dilute the concentrate to form the use composition can be referred to as water of dilution or a diluent, and can vary from one location to another. The resistance to corrosion can be provided when the diluent added to the concentrate to form the use solution is hard water or soft water, and can be added to a warewashing composition. In an exemplary embodiment, the concentrate may be diluted at a weight ratio of diluent to concentrate of at least about 20:1 or about 20:1 to about 2000:1. The use composition can have a solids content that is sufficient to provide the desired level of detersive properties while avoiding wasting the warewashing composition. The solids concentration refers to the concentration of the non-water components in the use composition. In an embodiment when the composition is provided as a use solution, the use composition can have a solids content of at least about 0.05 wt % to provide a desired level of cleaning. In addition, the use composition can have a solids content of less than about 1.0 wt % to avoid using too much of the composition. The use composition can have a solids content of about 0.05 wt % to about 0.75 wt %.

The concentrate may be diluted with water at the location of use to provide the use solution. When the composition is used in an automatic warewashing or dishwashing machine, it is expected that that the location of use will be inside the automatic warewashing machine. For example, when the composition is used in a residential warewashing machine, the composition may be placed in the detergent compartment of the warewashing machine. Depending on the machine, the composition may be provided in a unit dose form or in a multi-use form. When the warewashing composition is used in a residential or home-style dishwashing machine, the composition can be placed in the detergent compartment of the dishwashing machine. Often the detergent compartment is located in the door of the dishwashing machine. The warewashing composition can be provided in a form that allows for introduction of a single dose of the warewashing composition into the compartment. In general, a single dose refers to the amount of warewashing composition that is desired for a single warewashing cycle. In larger warewashing machines, a large quantity of composition may be provided in a compartment that allows for the release of a single dose amount of the composition for each wash cycle. Such a compartment may be provided as part of the warewashing machine or as a separate structure connected to the warewashing machine. For example, a block of the composition may be provided in a hopper and introduced into the warewashing machine when water is sprayed against the surface of the block to provide a liquid concentrate.

The warewashing composition may also be dispensed from a spray-type dispenser. Briefly, a spray-type dispenser functions by impinging a water spray upon an exposed surface of the composition to dissolve a portion of the composition, and then immediately directing the use solution out of the dispenser to a storage reservoir or directly to a point of use. When used, the product may be removed from the packaging (e.g. film) and inserted into the dispenser. The spray of water may be made by a nozzle in a shape that conforms to the shape of the solid detergent composition. The dispenser enclosure may also closely fit the shape of the detergent composition to prevent introducing and dispensing an incorrect composition.

Embodiments of Liquids and Solids

The present invention also relates to liquid and solid cleaning compositions including a hardness ion corrosion inhibitor. For example, when the composition is provided as a liquid, the present invention includes a gel or paste including a hardness ion corrosion inhibitor. For example, when the composition is provided as a solid, the present invention includes a cast solid including a hardness ion corrosion inhibitor.

Exemplary ranges for components of the warewashing composition when provided as a gel or a paste are shown in Table 1. Exemplary ranges for components of the warewashing composition when provided as a solid are shown in Table 2.

TABLE 1

Gel or Paste Warewashing Composition

| Component | First Exemplary Range (wt %) | Second Exemplary Range (wt %) | Third Exemplary Range (wt %) |
|---|---|---|---|
| Water | 5-60 | 10-35 | 15-25 |
| Alkaline Source | 5-40 | 10-30 | 15-20 |
| Silicate | 0-35 | 5-25 | 10-20 |
| Builder | 1-30 | 3-20 | 6-15 |
| Stabilizer | 0-20 | 0.5-15 | 2-10 |
| Dispersant | 0-20 | 0.5-15 | 2-9 |
| Enzyme | 0-15 | 0.5-10 | 1-5 |
| Corrosion Inhibitor | 0.01-15 | 0.5-10 | 1-5 |

TABLE 1-continued

Gel or Paste Warewashing Composition

| Component | First Exemplary Range (wt %) | Second Exemplary Range (wt %) | Third Exemplary Range (wt %) |
|---|---|---|---|
| Surfactant | 0.05-15 | 0.5-10 | 1-5 |
| Fragrance | 0-10 | 0.01-5 | 0.1-2 |
| Dye | 0-1 | 0.001-0.5 | 0.01-0.25 |

TABLE 2

Solid Warewashing Composition

| Component | First Exemplary Range (wt %) | Second Exemplary Range (wt %) | Third Exemplary Range (wt %) |
|---|---|---|---|
| Water | 0-50 | 1-30 | 5-20 |
| Alkaline Source | 5-40 | 10-30 | 15-20 |
| Builder | 1-60 | 25-50 | 35-45 |
| Bleach | 0-55 | 5-45 | 10-35 |
| Silicate | 0-35 | 5-25 | 10-15 |
| Dispersant | 0-10 | 0.001-5 | 0.01-1 |
| Enzyme | 0-15 | 1-10 | 2-5 |
| Corrosion Inhibitor | 0.01-15 | 0.05-10 | 1-5 |
| Surfactant | 0.05-15 | 0.5-10 | 1-5 |
| Fragrance | 0-10 | 0.01-5 | 0.1-2 |
| Dye | 0-1 | 0.001-0.5 | 0.01-0.25 |

The present hardness ion corrosion inhibitor of the warewashing composition can be provided in any of a variety of embodiments of compositions. In an embodiment, the present composition does not include phosphorus or nitrilotriacetic acid (NTA) containing compounds. Phosphorus-free refers to a composition, mixture, or ingredients to which phosphorus-containing compounds are not added. Should phosphorus-containing compounds be present, the level of phosphorus-containing compounds in the resulting composition should be less than about 0.5%, less than about 0.1%, and often less than about 0.01% by weight. NTA-free refers to a composition, mixture, or ingredients to which NTA-containing compounds are not added. Should NTA-containing compounds be present, the level of NTA in the resulting composition should be less than about 0.5%, less than about 0.1%, and often less than about 0.01% by weight. When the detergent composition is NTA-free, the detergent composition is also compatible with chlorine, which functions as an anti-redeposition and stain-removal agent.

In an embodiment, the present composition is substantially free of zinc.

In general, the present composition can be characterized as substantially free of zinc if the corrosion inhibitor contains no intentionally added zinc. For example, the present composition may be characterized as substantially free of zinc if it contains no zinc, or if zinc is present, the amount of zinc is less than about 0.01 wt-%. Zinc can unnecessarily consume certain builders or chelating agents, which is a reason to exclude it.

In an embodiment, the present composition includes a source of hardness ions (e.g., magnesium and calcium ions) that are characterized by the United States Food and Drug Administration as direct or indirect food additives.

According to the present invention, a liquid cleaning composition including a corrosion inhibitor can be prepared by a method including: providing a powder or crystalline form of corrosion inhibitor; melting the powder or crystalline form of the corrosion inhibitor; providing a sufficient amount of water to preclude solidification; and transferring the molten corrosion inhibitor into a mold.

According to the present invention, a solid cleaning composition including a corrosion inhibitor can be prepared by a method including: providing a powder or crystalline form of corrosion inhibitor; melting the powder or crystalline form of the corrosion inhibitor; transferring the molten corrosion inhibitor into a mold; and cooling the molten composition to solidify it.

According to the present invention, a solid cleaning composition including a corrosion inhibitor can be prepared by a method including: providing a powder or crystalline form of a corrosion inhibitor; gently pressing the corrosion inhibitor to form a solid (e.g., block or puck).

A solid cleaning or rinsing composition as used in the present disclosure encompasses a variety of forms including, for example, solids, pellets, blocks, and tablets, but not powders. By way of example, pellets can have diameters of between about 1 mm and about 10 mm, tablets can have diameters of between about 1 mm and about 10 mm or between about 1 cm and about 10 cm, and blocks can have diameters of at least about 10 cm. It should be understood that the term "solid" refers to the state of the detergent composition under the expected conditions of storage and use of the solid cleaning composition. In general, it is expected that the detergent composition will remain a solid when provided at a temperature of up to about 100° F. or greater than about 120° F.

In certain embodiments, the solid cleaning composition is provided in the form of a unit dose. A unit dose refers to a solid cleaning composition unit sized so that the entire unit is used during a single washing cycle. When the solid cleaning composition is provided as a unit dose, it can have a mass of about 1 g to about 50 g. In other embodiments, the composition can be a solid, a pellet, or a tablet having a size of about 50 g to 250 g, of about 100 g or greater, or about 40 g to about 11,000 g.

In other embodiments, the solid cleaning composition is provided in the form of a multiple-use solid, such as, a block or a plurality of pellets, and can be repeatedly used to generate aqueous detergent compositions for multiple washing cycles. In certain embodiments, the solid cleaning composition is provided as a solid having a mass of about 5 g to about 10 kg. In certain embodiments, a multiple-use form of the solid cleaning composition has a mass of about 1 to about 10 kg. In further embodiments, a multiple-use form of the solid cleaning composition has a mass of about 5 kg to about 8 kg. In other embodiments, a multiple-use form of the solid cleaning composition has a mass of about 5 g to about 1 kg, or about 5 g and to about 500 g.

Packaging System

In some embodiments, the solid composition can be packaged. The packaging receptacle or container may be rigid or flexible, and composed of any material suitable for containing the compositions produced according to the invention, as for example glass, metal, plastic film or sheet, cardboard, cardboard composites, paper, and the like.

Advantageously, since the composition is processed at or near ambient temperatures, the temperature of the processed mixture is low enough so that the mixture may be formed directly in the container or other packaging system without structurally damaging the material. As a result, a wider variety of materials may be used to manufacture the container than those used for compositions that processed and dispensed under molten conditions.

Suitable packaging used to contain the compositions is manufactured from a flexible, easy opening film material.

Dispensing of the Processed Compositions

The warewashing composition according to the present invention can be dispensed in any suitable method generally known. The warewashing composition can be dispensed from a spray-type dispenser such as that disclosed in U.S. Pat. Nos. 4,826,661, 4,690,305, 4,687,121, 4,426,362 and in U.S. Pat. Nos. Re 32,763 and 32,818, the disclosures of which are incorporated by reference herein. Briefly, a spray-type dispenser functions by impinging a water spray upon an exposed surface of the solid composition to dissolve a portion of the composition, and then immediately directing the concentrate solution including the composition out of the dispenser to a storage reservoir or directly to a point of use. When used, the product is removed from the package (e.g.) film and is inserted into the dispenser. The spray of water can be made by a nozzle in a shape that conforms to the solid shape. The dispenser enclosure can also closely fit the detergent shape in a dispensing system that prevents the introduction and dispensing of an incorrect detergent. The aqueous concentrate is generally directed to a use locus.

In an embodiment, the present composition can be dispensed by immersing either intermittently or continuously in water. The composition can then dissolve, for example, at a controlled or predetermined rate. The rate can be effective to maintain a concentration of dissolved cleaning agent that is effective for cleaning.

In an embodiment, the present composition can be dispensed by scraping solid from the solid composition and contacting the scrapings with water. The scrapings can be added to water to provide a concentration of dissolved cleaning agent that is effective for cleaning.

Methods Employing the Present Compositions

In an embodiment, the present invention includes methods employing the hardness ion corrosion inhibitor or a composition including the hardness ion corrosion inhibitor. The method can result in reducing corrosion or etching of an article. For example, in an embodiment, the present invention includes a method of reducing corrosion of a surface of a material exposed to water hardness. The method includes contacting the surface with a liquid containing the hardness ion corrosion inhibitor or a composition including the hardness ion corrosion inhibitor. The liquid can include dissolved composition. The method can also include providing the hardness ion corrosion inhibitor or a composition including the hardness ion corrosion inhibitor; and dissolving the composition in a liquid diluent (e.g., water). The method can contact the liquid to any of a variety of surfaces or objects including surfaces or articles including those made of glass, ceramic, porcelain, or aluminum.

In an embodiment, the present invention includes a method of cleaning an article while also reducing corrosion of the article. This method can include: providing a liquid or solid composition of a warewashing composition including a hardness ion corrosion inhibitor; contacting the solid block with an aqueous composition to form an aqueous composition including a hardness ion corrosion inhibitor; and contacting the aqueous composition including a hardness ion corrosion inhibitor to an article to clean the article and reduce corrosion of the article.

In an embodiment, the present methods can include injecting the present aqueous composition or placing the present composition into the water flow being used to rinse the surface. In an embodiment, the present method employs water that wasn't treated with a polymeric water softener bed such as in use today and which requires periodic regeneration with sodium chloride to work.

Contacting can include any of numerous methods for applying a composition, such as spraying the composition, immersing the object in the composition, or a combination thereof. A concentrate or use concentration of a composition of the present invention can be applied to or brought into contact with an article by any conventional method or apparatus for applying a cleaning composition to an object. For example, the object can be wiped with, sprayed with, and/or immersed in the composition, or a use solution made from the composition. The composition can be sprayed, or wiped onto a surface; the composition can be caused to flow over the surface, or the surface can be dipped into the composition. Contacting can be manual or by machine.

The present composition may be applied in any situation where it is desired to prevent surface corrosion or etching. The present composition may be employed in a commercial warewashing composition to protect articles, such as glass, ceramic and porcelain, from corrosion or etching in automatic dishwashing or warewashing machines during cleaning or in the cleaning of bottles. Applications in which the present composition may be used include: warewashing, rinse aids, cleaning-in-place operations in food and beverage production facilities, general purpose cleaning and destaining, bottle-washing, and industrial or household cleaners.

It should be understood that certain components that may be included in a warewashing composition because it is intended to be used in an automatic dishwashing machine can be excluded from a cleaning composition that is not intended to be used in an automatic dishwashing machine, and vice versa. For example, surfactants that have a tendency to create quite a bit of foaming may be used in a composition that is not intended to be used in an automatic dishwashing machine.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention has been described with reference to various specific and preferred embodiments and techniques. However, it should be understood that many variations and modifications may be made while remaining within the spirit and scope of the invention.

We claim:

1. A method of reducing corrosion of an article during cleaning, the method comprising:
   (a) diluting a warewashing composition with water at a dilution ratio of water to warewashing composition of at least about 20:1 to form a use composition, wherein the warewashing composition comprises:
      (i) a cleaning agent comprising a detersive amount of a surfactant;
      (ii) an alkaline source in an amount effective to provide a use composition having a pH of at least about 8 when measured at a solids concentration of about 0.5 wt%; and
      (iii) about 1 wt% to about 5 wt% of an unencapsulated corrosion inhibitor consisting of a mixture of a calcium salt and a magnesium salt, wherein the salt has a water solubility of less than about 0.5 wt% in water at about 20° C. and atmospheric pressure;
and the corrosion inhibitor reduces the corrosion of glass; and wherein the warewashing composition does not contain phosphorus-containing compounds; and
(b) contacting the article with the use composition in an automatic dishwashing machine, wherein the salt precipitates to form a protective layer on the article in contact with the use composition.

2. The method according to claim 1, wherein the cleaning agent constitutes about 0.05 wt% to about 15 wt% of the warewashing composition.

3. The method according to claim 1, wherein the cleaning agent comprises at least one of an anionic surfactant, a nonionic surfactant, a cationic surfactant and a zwitterionic surfactant.

4. The method according to claim 1, wherein the warewashing composition further comprises about 1 wt% to about 60 wt% of a builder, wherein the builder comprises a non-phosphorous containing builder.

5. The method according to claim 1, wherein the alkaline source comprises at least one of an alkali metal carbonate and an alkali metal hydroxide.

6. The method according to claim 5, wherein the alkaline source comprises at least one of sodium carbonate, potassium carbonate, sodium bicarbonate, potassium bicarbonate, sodium sesquicarbonate and potassium sesquicarbonate.

7. The method according to claim 5, wherein the alkaline source comprises at least one of sodium hydroxide and potassium hydroxide.

8. The method according to claim 1, wherein the magnesium salt is selected from the group consisting of magnesium acetate, magnesium benzoate, magnesium bromide, magnesium bromate, magnesium chlorate, magnesium chloride, magnesium chromate, magnesium citrate, magnesium formate, magnesium hexafluorosilicate, magnesium iodate, magnesium iodide, magnesium lactate, magnesium molybdate, magnesium nitrate, magnesium perchlorate, magnesium phosphinate, magnesium salicylate, magnesium sulfate, magnesium sulfite, magnesium tartrate, magnesium thiosulfate, a hydrate thereof, and a mixture thereof.

9. The method according to claim 1, wherein the magnesium salt is selected from the group consisting of magnesium aluminate, magnesium borate, magnesium carbonate, magnesium carbonate hydroxide, magnesium ferrate, magnesium fluoride, magnesium hydroxide, magnesium mandelate, magnesium oxalate, magnesium oxide, magnesium phosphate, magnesium silicate, magnesium tungstate, a hydrate thereof, and a mixture thereof.

10. The method according to claim 1, wherein the calcium salt is selected from the group consisting of calcium acetate, calcium benzoate, calcium bromate, calcium bromide, calcium chlorate, calcium chloride, calcium chromate, calcium dihydrogen phosphate, calcium dithionate, calcium formate, calcium gluconate, calcium glycerophosphate, calcium hydrogen sulfide, calcium iodide, calcium lactate, calcium metasilicate, calcium nitrate, calcium nitrite, calcium pantothenate, calcium perchlorate, calcium permanganate, calcium phosphate, calcium phosphinate, calcium salicylate, calcium succinate, a hydrate thereof, and a mixture thereof.

11. The method according to claim 1, wherein the calcium salt is selected from the group consisting of calcium aluminate, calcium carbonate, calcium chromium (III) oxide, calcium citrate, calcium diphosphate, calcium disilicide, calcium fluoride, calcium hydrogen phosphate, calcium hydroxide, calcium iron oxide, calcium iodate, calcium laurate, calcium magnesium carbonate, calcium magnesium silicon oxide, calcium malonate, calcium metaborate, calcium metaphosphate, calcium molybdate, calcium oleate, calcium oxalate, calcium oxide, calcium palmitate, calcium phosphate, calcium silicate, calcium silicon oxide, calcium silicon titanium oxide, calcium stearate, calcium sulfate, calcium sulfide, calcium sulfite, calcium tartrate, calcium titanate, calcium tungstate, a hydrate thereof, and a mixture thereof.

\* \* \* \* \*